United States Patent
Zhang et al.

(10) Patent No.: US 11,341,722 B2
(45) Date of Patent: May 24, 2022

(54) COMPUTER VISION METHOD AND SYSTEM

(71) Applicant: Kabushiki Kaisha Toshiba, Minato-ku (JP)

(72) Inventors: Chao Zhang, Cambridge (GB); Stephan Liwicki, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/922,439

(22) Filed: Jul. 7, 2020

(65) Prior Publication Data
US 2021/0012567 A1    Jan. 14, 2021

(30) Foreign Application Priority Data

Jul. 8, 2019 (GB) .................................... 1909785

(51) Int. Cl.
| | |
|---|---|
| *G06T 15/00* | (2011.01) |
| *G06T 17/20* | (2006.01) |
| *G06T 7/10* | (2017.01) |
| *G06T 17/10* | (2006.01) |
| *G06N 3/08* | (2006.01) |

(52) U.S. Cl.
CPC .............. *G06T 17/20* (2013.01); *G06N 3/08* (2013.01); *G06T 7/10* (2017.01); *G06T 17/10* (2013.01)

(58) Field of Classification Search
CPC ......... G06T 17/20; G06T 7/10; G06T 3/0062; G06T 17/10; G06N 3/08; G06N 3/0454;
(Continued)

(56) References Cited

U.S. PATENT DOCUMENTS

| | | | |
|---|---|---|---|
| 8,665,273 B2 * | 3/2014 | Kajikawa ................ | G06T 17/20 345/427 |
| 10,635,926 B2 * | 4/2020 | Hara .................... | G06N 3/0454 |

(Continued)

OTHER PUBLICATIONS

Zhang C, Liwicki S, Smith W, Cipolla R. Orientation-aware semantic segmentation on icosahedron spheres. InProceedings of the IEEE/CVF International Conference on Computer Vision 2019 (pp. 3533-3541).*

(Continued)

*Primary Examiner* — Phu K Nguyen
(74) *Attorney, Agent, or Firm* — Oblon, McClelland, Maier & Neustadt, L.L.P.

(57) ABSTRACT

A computer vision method for processing an omnidirectional image to extract understanding of a scene, the method comprising:
  receiving an omnidirectional image of a scene;
  mapping the omnidirectional image to a mesh on a three-dimensional polyhedron;
  convert the three dimensional polyhedron into a representation of a neighbourhood structure, wherein the representation of a neighbourhood structure represents vertices of said mesh and their neighbouring vertices; and
  processing the representation of the neighbourhood structure with a neural network processing stage to produce an output providing understanding of the scene,
wherein the neural network processing stage comprising at least one module configured to perform convolution with a filter, aligned with a reference axis of the three-dimensional polyhedron.

19 Claims, 14 Drawing Sheets

(a) Input sphere      (b) Icosahedron      (c) Unfolded representation (d) Image-grid-aligned representation of spherical data

(58) Field of Classification Search
CPC ... G06N 3/082; G06K 9/6273; G06K 9/00791
USPC ........................................................ 345/418
See application file for complete search history.

(56) References Cited

U.S. PATENT DOCUMENTS

| | | | | |
|---|---|---|---|---|
| 10,666,979 | B2* | 5/2020 | Izumi | H04N 19/119 |
| 10,692,274 | B2* | 6/2020 | Lim | G06T 17/20 |
| 10,911,781 | B2* | 2/2021 | Izumi | G06T 9/00 |
| 2014/0132598 | A1* | 5/2014 | Narukawa | G06T 15/20 |
| | | | | 345/419 |
| 2016/0203387 | A1 | 7/2016 | Lee et al. | |
| 2018/0182083 | A1 | 6/2018 | Natroshvili et al. | |
| 2018/0225876 | A1* | 8/2018 | Lim | G06T 19/00 |
| 2019/0057487 | A1 | 2/2019 | Cheng | |
| 2019/0199995 | A1* | 6/2019 | Yip | G06T 3/60 |
| 2021/0021868 | A1* | 1/2021 | Kim | H04N 19/119 |
| 2021/0089923 | A1* | 3/2021 | Kicanaoglu | G06T 3/0056 |
| 2021/0218889 | A1* | 7/2021 | Kim | H04N 19/11 |

OTHER PUBLICATIONS

British Examination Search Report dated Dec. 2, 2019 in Great Britain application 1909785.6 filed Jul. 8, 2019, 7 pages.

Lee, Y. et al., "SpherePHD: Applying CNNs on a Spherical PolyHeDron Representation of 360° Images," IEEE Conference on Computer Vision and Pattern Recognition (CVPR), Jun. 16-20, 2019, http://openaccess.thecvf.com/content_CVPR_2019/html/Lee_SpherePHD_Applying_CNNson_a_Spherical_PolyHeDron_Representation_of_360deg_CVPR_2019_paper.html [accessed Nov. 25, 2019], pp. 9181-9189.

Long, J. et al., "Fully Convolutional Networks for Semantic Segmentation," 2015 IEEE Conference on Computer Vision and Pattern Recognition (CVPR), 2015, doi: 10.1109/CVPR.2015.7298965, pp. 3431-3440.

Ronneberger, O. et al., "U-Net: Convolutional Networks for Biomedical Image Segmentation," MICCAI 2015: 18th International Conference, Oct. 5-9, 2015, Proceedings, Part 111, arXiv:1505.04597v1 [cs.CV], May 18, 2015, 8 pages.

Cohen, T. S. et al., "Spherical CNNs," Published as a conference paper at ICLR 2018, arXiv:1801.10130v2 [cs.LG] Feb. 25, 2018, 15 pages.

Cohen, T. S., et al., "Gauge Equivariant Convolutional Networks and the Icosahedral CNN," arXiv:1902.04615v1 [cs.LG] Feb. 11, 2019, 12 pages.

Jiang, C. M., et al., "Spherical CNNs on Unstructured Grids," Published as a conference paper at ICLR 2019, arXiv:1901.02039v1 [cs.CV] Jan. 7, 2019, 16 pages.

* cited by examiner

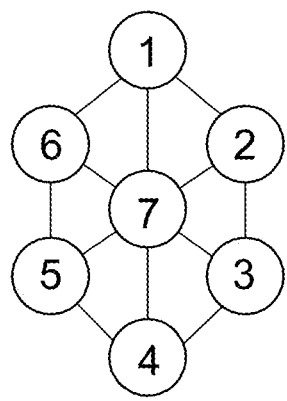
a
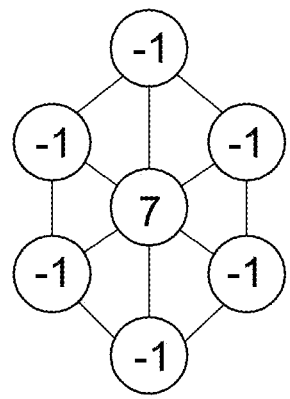
b
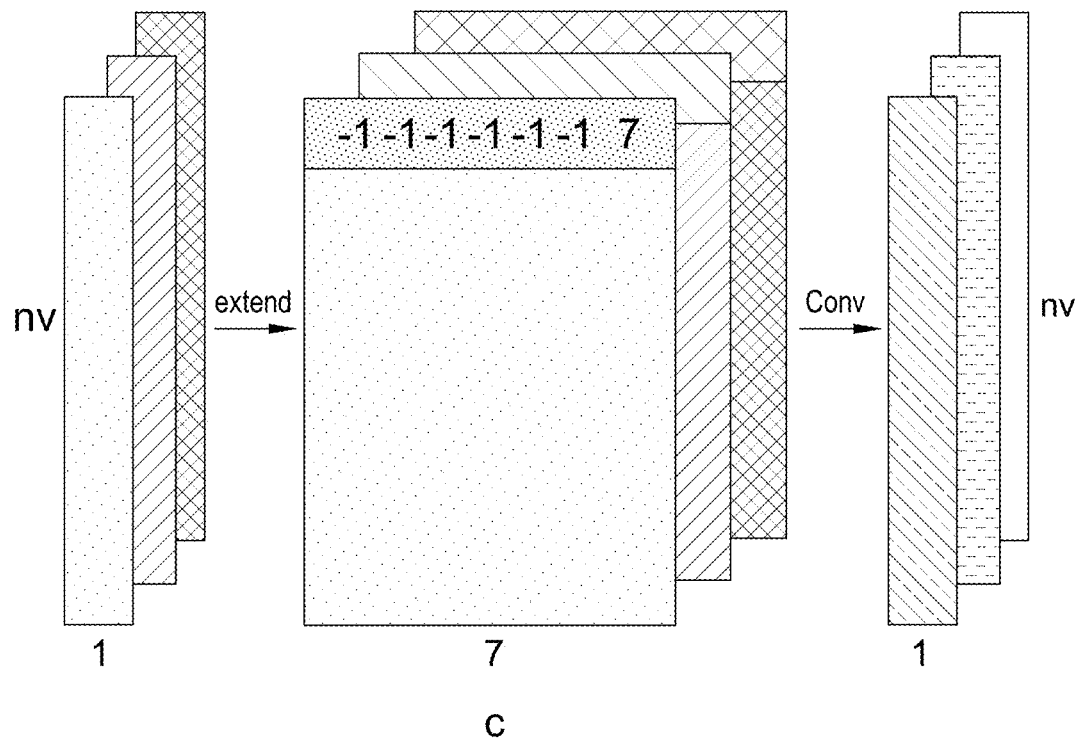
c
Figure 6

COMPUTER VISION METHOD AND SYSTEM

PRIORITY APPLICATION

This application claims the benefit of priority to GB Patent Application number No. 1909785.6, filed on 8 Jul. 2019.

FIELD

Embodiments are concerned with a computer vision system and method.

BACKGROUND

Many computer vision tasks, for example object recognition and registration require the segmentation of an image where regions of the image are provided with a label. Semantic Segmentation provides detailed pixel-level specification, which is particularly suited for applications which often require obstacle detection and accurate boundary detection. Accurate semantic segmentation is employed in application including but not limited to scene understanding, robotics, and medical image processing. Furthermore, semantic segmentation plays a key role in the autonomous driving technology.

The development of omnidirectional capturing devices and the increasing number of omnidirectional datasets makes it possible to employ such systems in relevant modern technology. Omnidirectional cameras provide great benefits over classical cameras to applications where the holistic understanding of the complete receptive field is required e.g. autonomous vehicles. However, the use of spherical input representation of the surroundings represents a challenge to the standard convolution neural networks (CNNs) used in semantic segmentation tasks.

BRIEF DESCRIPTION OF THE FIGURES

FIG. 6 is a tabular filter implementation in accordance with an embodiment.

DETAILED DESCRIPTION

Figure 1:
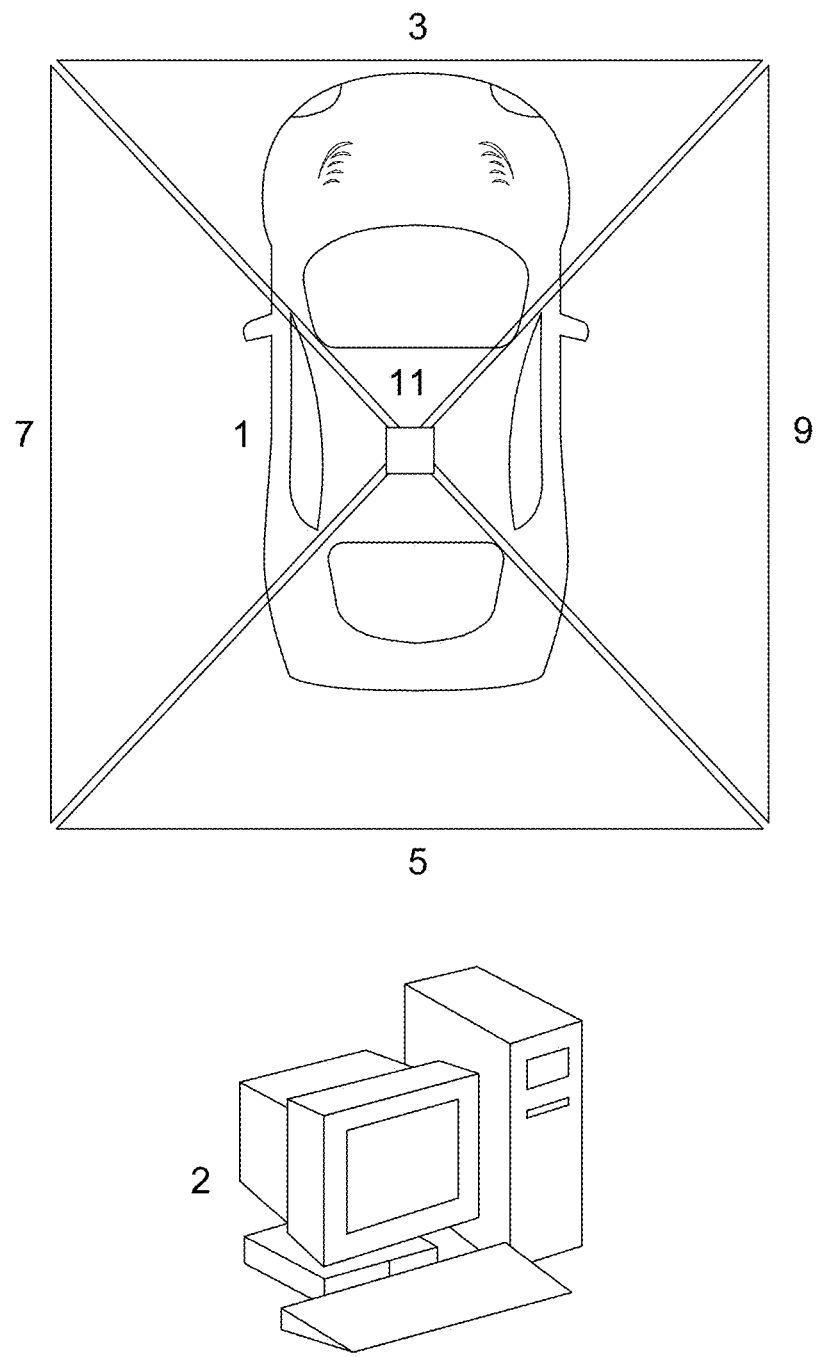
FIG. 1 is a system in accordance with an embodiment on a vehicle.

In an embodiment, a computer vision method is provided for processing an omnidirectional image to extract understanding of a scene, the method comprising:
  receiving an omnidirectional image of a scene;
  mapping the omnidirectional image to a mesh on a three-dimensional polyhedron;
  convert the three dimensional polyhedron into a representation of a neighbourhood structure, wherein the representation of a neighbourhood structure represents vertices of said mesh and their neighbouring vertices; and
  processing the representation of the neighbourhood structure with a neural network processing stage to produce an output providing understanding of the scene,
wherein the neural network processing stage comprising at least one module configured to perform convolution with a filter, aligned with a reference axis of the three-dimensional polyhedron.

In further embodiments, providing an understanding of the scene can comprises at least one of: semantic segmentation; localisation; detection of objects in the scene; registration of objects in the scene or camera pose estimation, 3D structure inference (e.g. depth), scene completion, style transfer (e.g. a summer scene transferred to a winter scene).

The disclosed system addresses a technical problem tied to computer technology and arising in the realm of computing, namely the technical problem of handling spherical images in a convolutional network in an efficient manner. The disclosed system solves the technical problem by mapping the spherical image to a polyhedron and processing the image with an orientation-aware convolutional neural network.

The above provides a novel approach of performing convolutional neural network operations on omnidirectional images where the planar representation of the spherical input representation simplifies the implementation of convolution operations and allows for exploitation of the orientation information of the scene.

In an embodiment, alignment of the filter with the reference axis is achieved using a first convolution and a second convolution and interpolating these two convolutions using interpolation parameters dependent on the location of the vertices on the three dimensional polyhedron that are being filtered, wherein the first and second convolutions have the same convolution weights and the weights of the first convolution are rotated with respect to the weights of the second convolution, The rotation of the convolution can be thought of in terms of the position of a vertex and its neighbouring vertexes on the sphere, the rotated convolution being rotated with respect to the neighbouring vertices on the polyhedron.

Thus, it is possible to provide an orientation aware filter for each vertex, by combining two convolutions using the same filter. Both of these convolutions share the same network weights, and are applied to a vertex and its neighbours and the results from these two convolutions are combined. However, different interpolation weightings are applied when combining the results of the two convolutions. The applied interpolation weightings are dependent on the position of the vertex on the polyhedron.

Thus, the proposed framework allows for fast network operations under consideration of north-aligned filter convolutions for features on the sphere. The memory efficiency of the framework is demonstrated up to a level-8 resolution icosahedron mesh, which is equivalent to a 640×1024 equirectangular image. Since the filter of the framework operates on the tangent of the sphere, feature weights, pre-trained on perspective data, can be directly transferred with only small need for weight refinement. The proposed system may be utilised for a wide range of tasks such as localization tasks, semantic segmentation and classification tasks, image refinement and depth estimation tasks.

In an embodiment, the omnidirectional image is mapped to a regular polyhedron. In some embodiments, the polyhedron is an icosahedron. The icosahedron is the convex geodesic grid with the largest number of regular faces. It comprises 12 vertices and 20 equivalent equilateral triangular faces. Each triangular face of the icosahedron can be further divided into four equivalent equilateral triangles. Therefore, the icosahedron shape provides a way for resolution increase through face subdivision.

In an embodiment of the method, the method further comprises the steps of unfolding the three-dimensional polyhedron to produce a two-dimensional unfolded polyhedron, aligning the two-dimensional unfolded polyhedron with a rectangular grid to produce an aligned to a rectangular grid omnidirectional image, and the filter comprising weights and wherein the weights of the filter are arranged in a hexagonal formation.

In a further embodiment, the neighbourhood structure is represented as a plurality of vectors, where each vector comprises a vertex of said mesh and its neighbouring vertices. This tabular structure can also be based on a geometry where, on the polyhedron, the neighbouring vertices to a vertex surround the vertex in a hexagon. Thus, the same geometrical approach for determining interpolation weights can be used as for the above embodiment where the polyhedron is unfolded. I The complete receptive field is exceptionally important for autonomous driving systems such as driverless vehicles, watercrafts, and aerial vehicles such as drones. However, the implementation of the method is not only limited to the aforementioned applications. Further applications may include implementation on personal omnidirectional cameras and handheld devices, such as mobile phones and tablets, wearable devices, autonomous robots such as vacuum cleaners and lawn mowers, surveillance systems, or virtual and augmented reality headsets. Spherical images can be represented as planar equirectangular images, as conversion from spherical images to equirectangular images is done through linear one-to-one mapping however, the method introduces latitude dependent distortion and the spherical images are distorted drastically especially in polar regions. Furthermore, for equirectangular input CNN can be directly applied, but weight sharing is only available in horizontal direction and therefore the model requires more parameters than a perspective one. Another approach is to adapt the weights of the grid kernel and process the equirectangular images as perspective ones according to the elevations angles, however, weight sharing is only enabled along the longitude to reduce computational cost and degradation in accuracy.

Adapting the filter weight formation to fit the polyhedron formation, allows for the sampling locations to be precomputed and minimises distortions, thus allowing weight sharing at all pixel locations.

In an embodiment, the omnidirectional image is a partial omnidirectional image, the partial omnidirectional image covering less than the full surface area on a sphere. In a further embodiment the images can be RGB, HUV, IR, SAR images, as well as images provided by LiDARs and depth sensors.

In an embodiment, the two-dimensional unfolded polyhedron is divided into a plurality of equivalent components, and the vertices of each component are aligned to a rectangular grid. In a further embodiment, a layer of one pixel is added to at least one sided of each of the components before they are processed with the convolutional neural network. The additional pixel layer insures the spatial dimensions of the output of the convolutional neural network are identical as the spatial dimensions of its input.

In an embodiment, the additional layer of pixels is provided from the neighbouring components, which ensures that meaningful information is used for the so-called padding layer of pixels.

In an embodiment, the filter is aligned with the north-south poles axis, where the north-south pole axis is defined by a pair of vertices having a maximum z-axis distance on the polyhedron. Omnidirectional images are orientable with the existence of north and south poles. Furthermore, aligning the filters with reference to the north-south poles axis is essential for omnidirectional semantic segmentation and orientation-aware tasks.

In an embodiment, the three-dimensional polyhedron is unfolded along a line, wherein the line is equidistant from each of the pair of vertices with maximum z-axis distance on the polyhedron.

In an embodiment, affine transformation is used to aligned the vertices of the two-dimensional unfolded polyhedron mesh with the rectangular grid. It is proposed an orientation-aware convolutional neural network (CNN) for polyhedron. The representation allows for fast network operations, as the design simplifies to standard network operations of two-dimensional CNNs, but under consideration of north-aligned kernel convolutions for features on the sphere. In an embodiment, the filer is aligned with the reference axis of the three-dimensional polyhedron through at least one convolution weighted with an arc-interpolation parameter. In a further embodiment, the arc-interpolation parameter is based on the angular distance between the vector, originating from the central point of the hexagonal formation of filter weights and directed towards two neighbouring points of the hexagonal formation of filter weights, and the reference axis.

In an embodiment, the filter is applied to a plane tangential to the omnidirectional image at the point of each vertex of the polyhedron.

The omnidirectional image does not have to be a full sphere, In an embodiment, the method receives a partial omnidirectional image, the partial omnidirectional image covering less than the full surface area of a sphere. The omnidirectional image may be generally spherical. The term spherical is used here to mean any image which is generally a spheroid, ovoid or other generally spherical shape.

In an embodiment, the weights of the filter are interpolated from the kernel of a pre-trained perspective network.

In an embodiment, the weights of the filter are learned from a perspective dataset.

The above embodiments generally relate to a singular convolutional layer within a convolutional neural net "CNN". Typically, such a convolutional layer can be provided in combination with pooling layers in a convolutional neural net.

The CNN is then trained using training data with an output indicated the type of information to be derived from the scene, for example, sematic segmentation, object recognition, localisation etc.

In further embodiments, the above convolutional layer is provided as one of many convolutional layers within a CNN. The above convolutional layer may also be repeated multiple times within a CNN.

In an embodiment, a computer implemented method is provided for training a model for processing an omnidirectional image to extract understanding of a scene, the model comprising:

a first mapping stage to map an omnidirectional image to a mesh on a three-dimensional polyhedron;
a second mapping stage to convert the three dimensional polyhedron into a representation of a neighbourhood structure, wherein the representation of a neighbourhood structure represents vertices of said mesh and their neighbouring vertices;
a processing stage to process the representation of the neighbourhood structure with a neural network processing stage to produce an output providing understanding of the scene, wherein the processing stage comprising at least one module configured to perform convolution with a filter, aligned with a reference axis of the three-dimensional polyhedron, the training method comprising:

providing training data, the training data comprising image and semantic segmented information about said image;
training said model using said images as the input and the semantic segmented information as the output.

In an embodiment, a system for processing an omnidirectional image to extract understanding of a scene is provided, the system comprising an interface and a processor, the interface having an image input and being configured to receive an omnidirectional image of a scene,
the processor being configured to:
map the omnidirectional image to a mesh on a three-dimensional polyhedron;
convert the three dimensional polyhedron into a representation of a neighbourhood structure, wherein the representation of a neighbourhood structure represents vertices of said mesh and their neighbouring vertices; and process the representation of the neighbourhood structure with a neural network processing stage to produce an output providing understanding of the scene, wherein the neural network processing stage comprises at least one module configured to perform convolution with a filter, aligned with a reference axis of the three-dimensional polyhedron.

In a further embodiment, a detection system for a vehicle is provided, said detection system comprising the system for segmenting an omnidirectional image as described above, being adapted to receive an image and determine objects from said image by segmenting said image.

FIG. 1 illustrates an object classification system that uses an image processing method in accordance with an embodiment. The system is provided on board a vehicle so that the system travels along the vehicle.

FIG. 1 shows a schematic of a vehicle 1, where the vehicle 1 is equipped with a collision avoidance system. The collision avoidance system comprises omnidirectional capturing device 11, comprised of four cameras 3, 5, 7, 9, and a single central processing unit (CPU) 2. In some embodiments, the processing unit is a graphics processing unit (GPU). Camera 3 is positioned to face the direction of travel, camera 5 is positioned to face the direction opposite the direction of travel, camera 7 is positioned to face in the left direction perpendicular to the direction of travel, and camera 9 is positioned to face in the right direction perpendicular to the direction of travel. However, any arrangement can be envisaged where the combined field of view of the cameras extends at least partially around the vehicle. Each of the cameras 3, 5, 7, 9 has an extreme wide field of view of 90 degrees and are provided so that a complete 360-degree image of the surrounding of the car may be captured. In one embodiment, each camera 3, 5, 7, 9 may be provided with extreme wide-angle fisheye lens.

The single processing unit 2 is used to process the wide-angle images captured by cameras 3, 5, 7, 9. The processing of the images will be explained with reference to FIG. 2.

Figure 2:
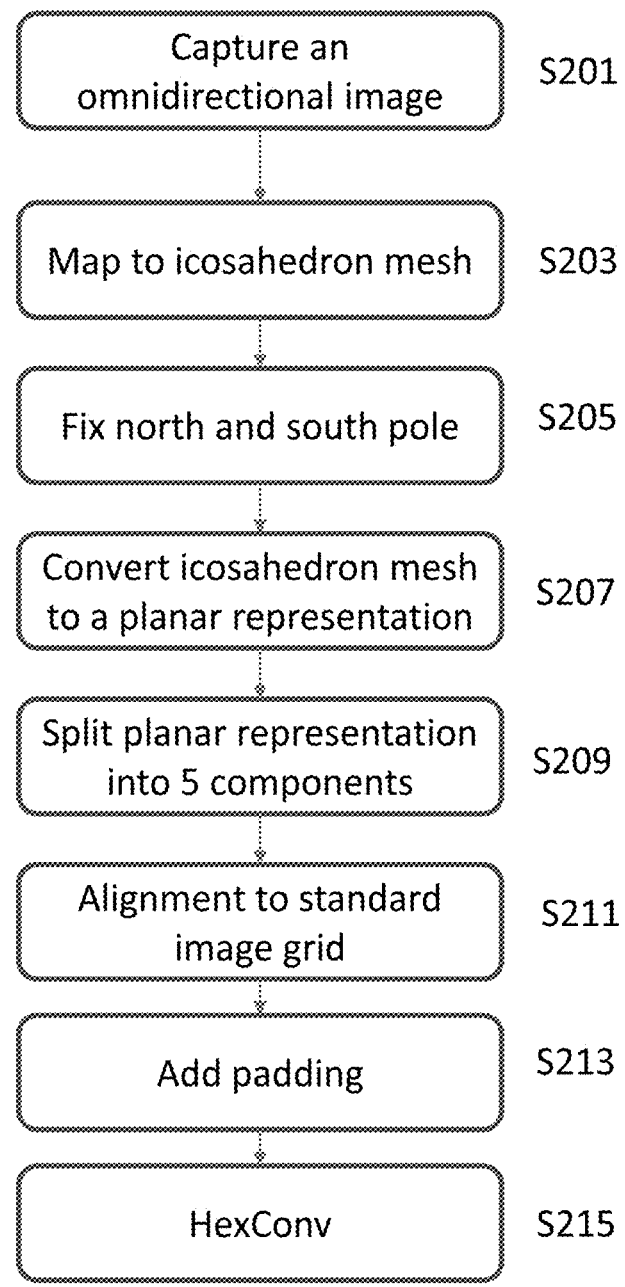
FIG. 2 is a flow diagram of a method of orientation aware semantic segmentation on icosahedron spheres.

The embodiments described above relate to a system for autonomous guidance of a vehicle such as a car or a drone. However, the image processing method can also be applied to any other system requiring a semantic segmentation of images. FIG. 2 shows a flow diagram of the method, in accordance with an embodiment, for semantic segmentation.

In Step S201, cameras 3, 5, 7, 9 capture images of the surrounding scene. In an embodiment, the scene is a city street scene and comprises one or more objects. In such scenes the orientation and the position of some objects is similar across the dataset. Such objects include the sky, sidewalks, buildings and roads. The captured perspective image by cameras 3, 5, 7, 9 are mapped to panoramic sphere since they relate to a view taken around an object or scene. The images mapped to the panoramic sphere are then warped to form an equirectangular image, The omnidirectional capturing device 11 then outputs an omnidirectional image representation of the surrounding (the equirectangular image) to the object classification system, where the objects of the scene are consequently identified and classified.

In an embodiment, it is assumed that the input images is oriented, so that the top of it mapped to north pole and bottom mapped to south pole. Data augmentation could be used to allow slight orientation changes. Also, to cope with different cameras or camera pose changes, gyroscope could be considered to alleviate the effect.

In Step S203, the equirectangular image is mapped to an icosahedron mesh. Mapping a spherical image onto a plane introduces heavy distortions to the image, which are most evident at the poles. The introduced distortions significantly complicate the accurate classification of the objects positioned in said regions of the image.

Figure 3:
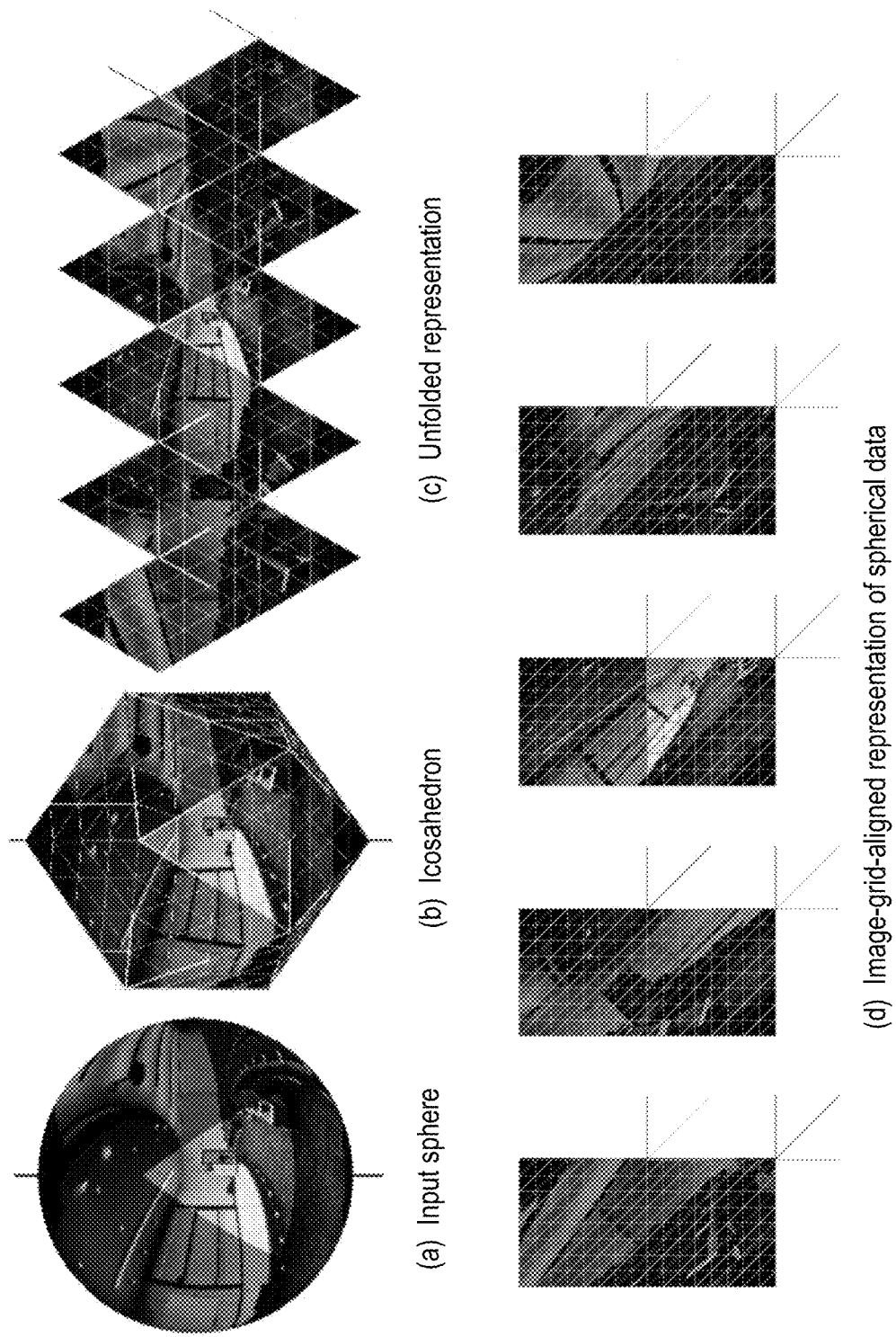
FIG. 3 is a graphical representation of the data format at different stages of the network of orientation aware segmentation on icosahedron spheres.

In order to reduce the effects of the image distortion, the omnidirectional image is divided into a set of equally-sized planar regions, denoted by the unshaded section of the sphere shown in FIG. 3(a). In an embodiment, each of the equally-sized regions is mapped to one of the faces of an icosahedron, FIG. 3(b).

The icosahedron grid comprises 20 equivalent equilateral triangular faces and 12 vertices at the lowest resolution r=0. A further resolution increase can be achieved by subdivision of the triangular faces of the icosahedron at r=0 into $4^r$ equal equilateral triangular parts following equation (1) and (2), where $f^r$ denotes the number of faces at resolution r for r≥0, and $n_r$ denotes the number of vertices at resolution r for r≥0.

$$f^r = 20 \times 4^r \tag{1}$$

$$n_r = 2 + 10 \times 4^r \tag{2}$$

Mapping the equirectangular image to the corresponding face of the icosahedron mesh is performed by calculating the spherical coordinates for each pixel of each face of the icosahedron. These are then used to find the corresponding pixels in the omnidirectional image by following equations (3) and (4), where θ and φ are the spherical coordinates of each pixel, the variables $s_w$ and $s_h$ denote the width and the height of the equirectangular image respectively.

$$x = s_w \left( \frac{\theta + \frac{\pi}{2}}{2\pi} \right) \tag{3}$$

$$y = s_h \left( 1 - \frac{\varphi + \frac{\pi}{2}}{\pi} \right) \tag{4}$$

Mapping the omnidirectional image to an icosahedron, the most uniform and accurate discretisation of a sphere, allows for minimising the introduced distortion.

The omnidirectional images are orientable with the existence of north and south poles. Therefore, in an embodiment, in step S205, a north and a south pole are affixed to a pair of vertices having maximum z-axis distance on the icosahedron mesh at resolution level r=0.

Subsequently in step S207, the 3D icosahedron mesh, shown in FIG. 3(b) is unfolded along the equator to a planar 2D representation, FIG. 3(c).

The 2D planar representation of the icosahedron mesh is then divided into 5 equivalent parallelograms, Step S209. Each parallelogram comprises 4 equilateral triangular faces of the icosahedron mesh. Combined together the 5 equivalent parallelograms cover all 20 faces of the icosahedron.

In Step S211, the vertices contained in each of the 5 parallelogram are aligned with a regular image grid through affine transformation. Using affine transformation allows for the vertices lying in a line of the icosahedron mesh to be positioned in a line of the image grid. While the collinearity and the distance ratios between vertices is preserved, the angles and lengths of the icosahedron grid are altered in order to align with a regular image grid, FIG. 3(d).

Standard convolutional neural networks can only generate an output for positions of the input volume at which the convolutional filter fits in its entirety, and therefore the output volume will comprise dimensions smaller than the dimensions of the input volume. In applications where it is desirable that the dimensions of the input and the output volume are identical, the common techniques of zero padding is employed. Similarly, in an embodiment of the network, padding is added to all four sides of each of the 5 image-grid-aligned segments of the icosahedron. However, in this case the padding consists of segments which are also present in the neighbouring parts of the icosahedron. As further explained below, after padding is added, the segments are input to a convolution layer with a hexagonal filter which can be represented as a standard 3×3 convolutional filter. For that reason, the addition of padding of a single pixel to each side of the segments is sufficient to ensure that the output volume will have the same dimensions as the input volume.

Below is presented the algorithm for adding padding around the components. Each of the 5 components of the icosahedron $\{C_i\}_{i=0}^4$ have length W and height 2W. Padding $\{P_i\}_{i=0}^4$ for the top T and left side L of each components is then computed using the west neighbour and padding $\{P_i\}_{i=0}^4$ for the right R and bottom B side is computed using the east neighbour.

```
for i ← {0, . . . , 4} do                    // pad each component
 |    C_w ← C ;                              // west neighbor
 |    T ← [ C_w(W, W) to C_w(1, W)   0 ];
 |
 |         ⎡ [C_w(W + 1, W) to C_w(2W, W)]^T ⎤
 |    L ← ⎢ [C_w(2W, W − 1) to C_w(2W, 1)]^T ⎥ ;
 |         ⎣                0                ⎦
 |
 |    P_i ← ⎡     T      ⎤ ;                 // top & left
 |          ⎣ [ L  C_i ] ⎦
 |
 |    if pad all sides then
 |    |    C_e ← C_{mod(i+1,5)} ;            // east neighbor
 |    |    B ← [ 0   C_e (2W, 1)   to   C_e (W + 1, 1) ];
 |    |
 |    |         ⎡           0             ⎤
 |    |    R ← ⎢ [C_e(1, W) to C_e(1, 1)]^T ⎥ ;
 |    |         ⎣ [C_e(1, 1) to C_e(W + 1, 1)]^T ⎦
 |    |
 |    |    P_i ← ⎡⎡ P_i ⎤   ⎤ ;              // bottom & right
 |    |         ⎣⎣  B  ⎦ R  ⎦
 |    |
 |    end
end
```

Figure 4:
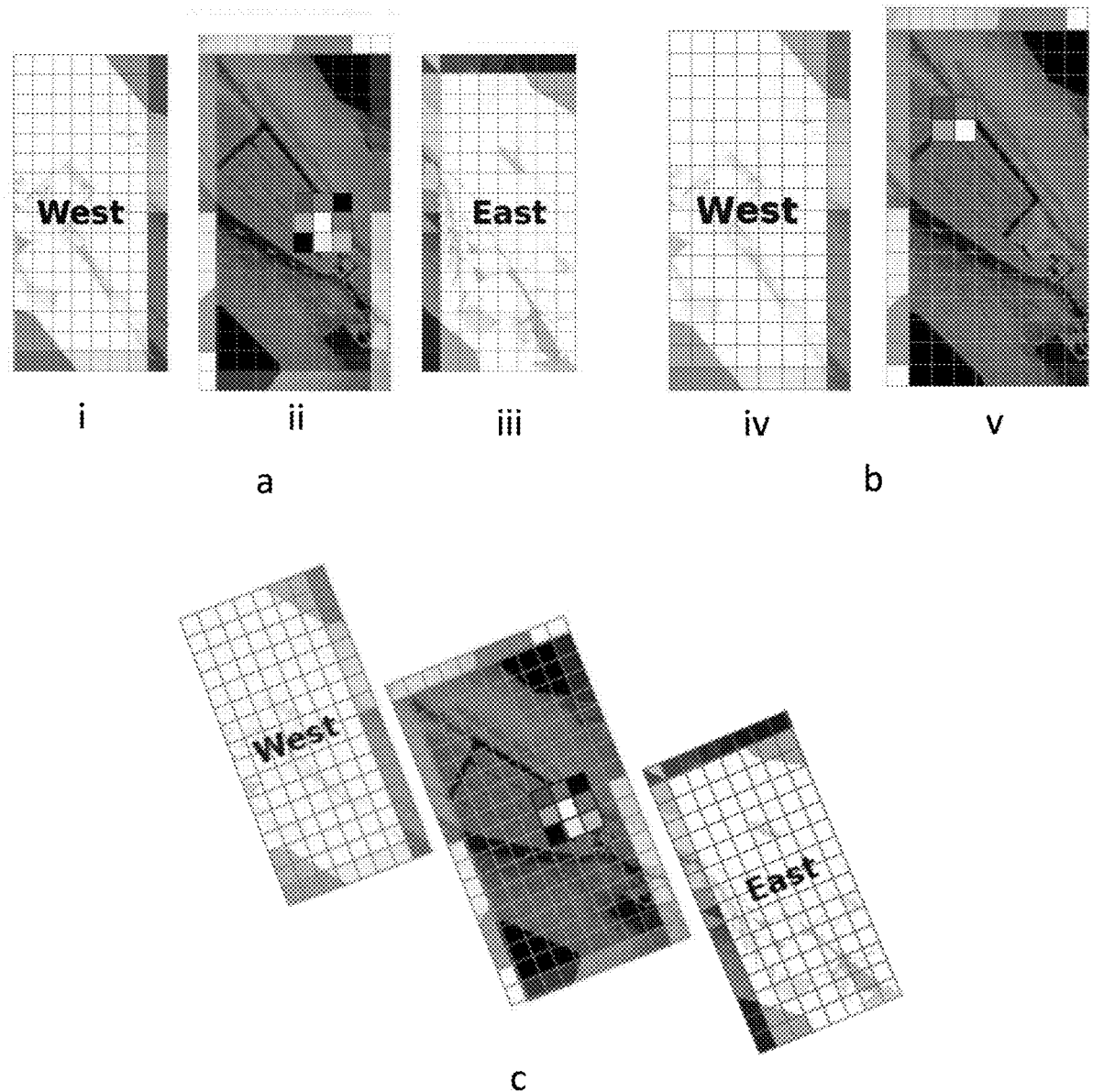
FIG. 4 is an example of padding the sphere components with features from the neighbouring sphere components.

For example, referring to FIG. 4(a), the padding of the top side T of component ii is comprised the top right-hand side of component i, where top side of component ii and the top right side of component i have been stitched together before the icosahedron mesh has been unfolded. FIG. 4(c) more clearly shows the relative placement of component ii in relation to its neighbouring components i and iii and the sections of said components which have been stitched together before the icosahedron mesh has been unfolded. In the algorithm above, this is implemented as the padding $\{P_i\}_{i=0}^4$ for the top side T of each component $\{C_i\}_{i=0}^4$ is assigned $C_w$ (W,W) to $C_w$(1,W) of its west component $C_w$. As the width and the height of the components Is Increased by 2 from W and 2W to W+2 and 2W+2, the empty pixels are filled with zeros, shown in white in FIG. 4(a).

Similarly, the padding added to the right side of component ii is comprised of the top and top-left side of component iii because the right side of component ii has been stitched to the top and top-right side of component iii before the icosahedron mesh has been unfolded. Referring to the algorithm above again, this is achieved by assigning [$C_e$(1,W) to $C_e$(1,1)] and [$C_e$(1,1) to $C_e$(w+1,1)]. The one remaining pixel is assigned a zero, FIG. 4.1.

In applications, where a convolution layer with 2×2 filter is applied, the padding is added only on the top and the left side of each component, FIG. 4(b), using the above-mentioned algorithm.

Following equations (1) and (2) and as shown in FIG. 3(b), the icosahedron mesh has 12 vertices and 20 equilateral triangular faces at resolution level r=0. With every further resolution level r>0, the triangular faces are further divided into 4 identical triangles. If only the vertices of the level-0 icosahedron mesh are considered, each vertex forms a neighbourhood with 5 neighbouring vertices. In the case, of all other vertices, each vertex forms a neighbourhood with 6 neighbouring vertices. The neighbourhood, excluding the neighbourhoods at the level-0 vertices, are hexagonally shaped, with a vertex in the middle, and 6 other vertices located around it at an equal distance from the central vertex and their left and right neighbour. For that reason, in an embodiment of the method of orientation-aware semantic segmentation on icosahedron spheres, a convolution with hexagonal filter is employed, FIG. 5. In its natural implementation the hexagonal filter is aligned to the icosahedron mesh and consequently the filter orientation is inconsistent throughout the icosahedron components after the icosahedron mesh has been unfolded, as the surfaces of the components near the north and the south poles are stitched for one other. In order to reduce the distortions, caused by the inconsistent orientation of the filter, the filters are north-aligned through interpolation, explained further below.

Naïve convolution with weights $\{w_j\}_{j=1}^7$ at each vertex $v_i$ and their neighbours $$\{v_{n_j^i}\}_{j=1}^6$$

is computed following equation 5, where $n_j^i$ holds the neighbourhood indices for each vertex $v_i$. It is worth noting that as the vertices of the level-0 icosahedron mesh to which the south and north poles are affixed do not have well-defined orientation, dropout is employed and their neighbourhoods are simply skipped during convolution and pooling operations.

$$\sum_{j=1}^6 w_j v_{n_j^i} + w_7 v_i \qquad (5)$$

In an embodiment of the proposed method, the vertices neighbourhoods are north-aligned with interpolations with the hexagonal filter and using arc-based weights $\{\theta_j^i\}_{j=1}^6$. Thus, Equation 5 can be rewritten as:

$$\sum_{j=2}^6 w_j\left(\theta_j^i v_{n_j^i} + (1-\theta_j^i)v_{n_{j-1}^i}\right) + w_1\left(\theta_1^i v_{n_1^i} + (1-\theta_1^i)\right) + w_7 v_i \qquad (6)$$

Furthermore, since the hexagonal neighbourhoods are substantially symmetric, an unified weight $\{\alpha_i \approx \theta_j^i\}_{j=1}^6$ may be introduced, and hence Equation 6 can be written as:

$$\alpha_i\left(\sum_{j=1}^6 w_j v_{n_j^i} + w_7 v_i\right) + (1-\alpha_i)\left(\sum_{j=2}^6 w_j v_{n_j^i} + w_1 v_{n_6^i} + w_7 v_i\right) \qquad (7)$$

Following Equation 7, north-aligned filters can be achieved through 2 standard convolutions with the hexagonal filter and weighting the result of each convolution based on the arc-interpolation weight $\alpha_i$. Arc-interpolation weight $\alpha_i$ is determined based on the angles between vectors $v_i-v_{n_1^i}$, and $v_i-v_{n_6^i}$ and the plane with normal $$n_i = \frac{v_i \times a}{|v_i \times a|},$$

where a is the north-south axis, $a=[0\ 1\ 0]^T$, as presented in FIG. 5a and FIG. 5b. The arc-interpolation weight for each of the two convolution are calculated using angles $\phi_i$ and $\psi_i$, where $\phi_i$ denotes the angle between the north-south axis and vector $v_i-v_{n_1^i}$ and $\psi_i$ denotes the angle between the north-south axis and vector $v_i-v_{n_6^i}$ and are given by Equations 8.

$$\psi_i = \arccos\frac{(v_i-v_{n_1^i})^T(I-n_i n_i^T)(v_i-v_{n_1^i})}{|(v_i-v_{n_1^i})||(I-n_i n_i^T)(v_i-v_{n_1^i})|} \qquad (8)$$

$$\phi_i = \arccos\frac{(v_i-v_{n_6^i})^T(I-n_i n_i^T)(v_i-v_{n_6^i})}{|(v_i-v_{n_6^i})||(I-n_i n_i^T)(v_i-v_{n_6^i})|}$$

Figure 5:
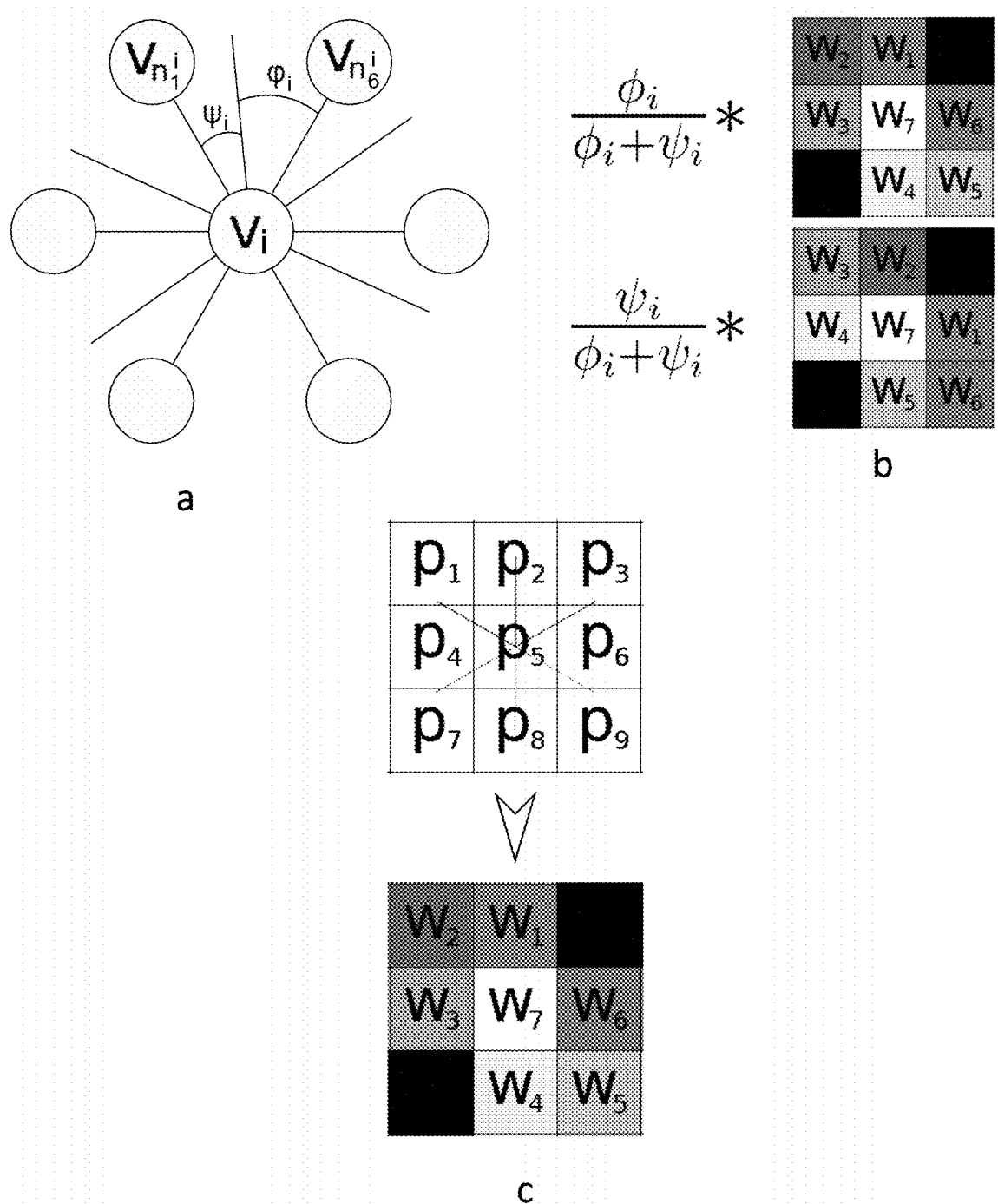
FIG. 5 is a filter and north-alignment representation in accordance with an embodiment.

For example, referring to FIGS. 5 (a) and (b), two extreme cases may be considered. First case is when $\psi_i=0$ and $w_1$ aligns with $V_{n_1^i}$. Second case is when $\phi_i=0$ and $W_2$ aligns with $V_{n_1^i}$.

Furthermore, as shown in FIG. 5(b), a weight $W_1$, $W_2$, $W_3$, $W_4$, $W_5$, $W_6$, $W_7$ is applied to each of vertex. Since the hexagonal filter is applied at the tangential plane of each vertex on the sphere, a weight transfer is possible from a pre-trained perspective network. The hexagonal filter comprises 7 weights, one for each vertex in the vertex neighbourhoods, and the hexagonal filter dimensions match the kernel dimensions of a standard 3×3 kernel of a pre-trained perspective network, therefore the vertex weights of the hexagonal filter can be interpolated from the weights of the perspective kernel. The weight transfer from the perspective network is performed in advance and involves the initial step of aligning the north-south axis of the hexagonal filter with the axis going through the second and eight weights of the perspective network, $p_2$ and $p_8$ respectively, FIG. 5(c). There is a complete correspondence between weights $W_1$, $W_4$, $W_7$ of the hexagonal filer and weights $p_2$, $p_8$, $p_5$ of the perspective network filter, therefore these weights are transferred directly from the perspective filter to the hexagonal filter. Weights $W_2$, $W_3$, $W_5$, $W_6$ are estimated using bi-linear interpolation following equations 9. Consecutively, weight refinement is employed in order to improve the task performance.

$$w_1 = p_2 \qquad (9)$$
$$w_2 = \sin\frac{\pi}{3}\frac{p_1+p_4}{2} + \left(1-\sin\frac{\pi}{3}\right)\frac{p_2+p_8}{2}$$
$$w_3 = \sin\frac{\pi}{3}\frac{p_4+p_7}{2} + \left(1-\sin\frac{\pi}{3}\right)\frac{p_5+p_8}{2}$$
$$w_4 = p_8$$
$$w_5 = \sin\frac{\pi}{3}\frac{p_6+p_9}{2} + \left(1-\sin\frac{\pi}{3}\right)\frac{p_5+p_8}{2}$$
$$w_6 = \sin\frac{\pi}{3}\frac{p_2+p_6}{2} + \left(1-\sin\frac{\pi}{3}\right)\frac{p_2+p_6}{2}$$
$$w_7 = p_5$$

In an embodiment, of network for orientation-aware semantic segmentation of omnidirectional images, the filter is applied directly to the folded icosahedron mesh. Initially, each vertex is presented in a multi-channel tabular format, as shown in FIG. 6(c), where in each channel corresponds to an RGB value of the image at said vertex. In the Figure, nv denotes the number of vertices of the icosahedron mesh. In a further embodiment of the tabular filter implementation, more channels, such as a depth channel, for example, can be added.

As mentioned above, each vertex and the six neighbouring vectors can be organised in a vector neighbourhood, comprised of a central vertex denoted with number 7 in FIG. 6(a) and 6 neighbouring vertices denoted with 1, 2, 3, 4, 5 and 6 in FIG. 6(a). The initial entries of the table corresponding to the central vertices are expanded to include not only the values of the central vertex of each neighbourhood but also the values of the neighbouring vertices 1, 2, 3, 4, 5, and 6, as shown in FIG. 6(c).

Figure 7:
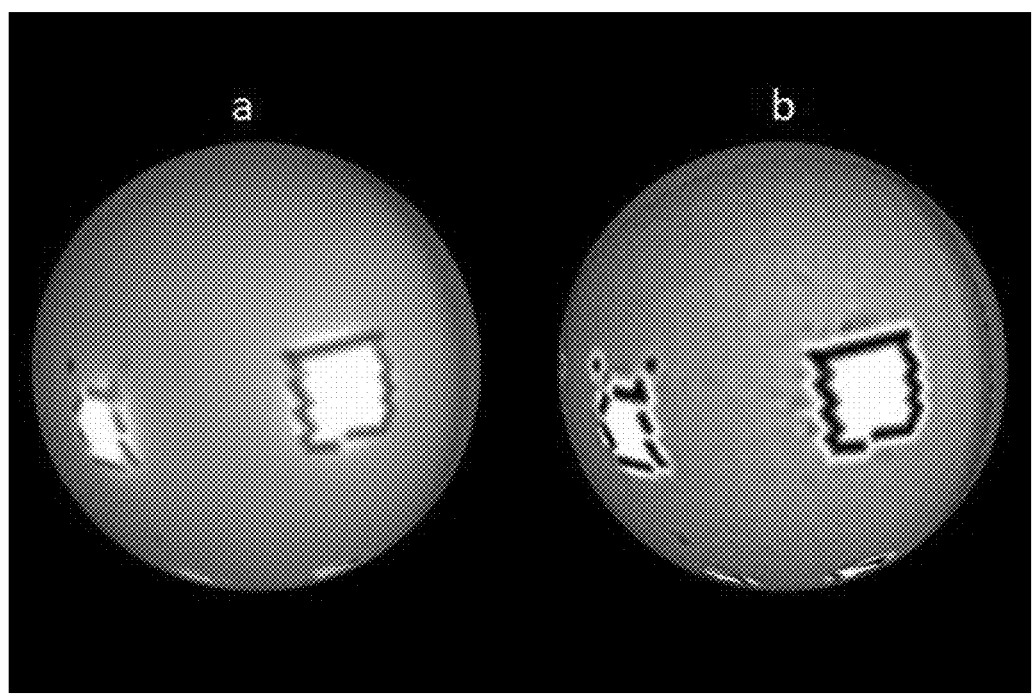
FIG. 7 is quantitative image sharpening results of the convolutional neural network implemented with a tabular filter.

FIG. 6(b) shows an example of the filter weights values, where the filter weights are presented in a hexagonal formation. In the Figure, the filter weights values are so chosen to perform an image sharpening operation. A result achieved by the image sharpening filter are shown in FIG. 7.

Before being applied to each vertex neighbourhood entry of the table, the weights of the filter are organised in a 1×7 filter formation, as shown in FIG. 6(c), where the weights are aligned with the corresponding vertices. The filter is applied to using a Conv2D layer, which generates a 3-channel output. FIG. 7(a) shows the input image and FIG. 7(b) shows the output image. In FIG. 7(b) the edges of the ceiling lights are evidently sharper than the edges of the ceiling lights on the original image, FIG. 7(a).

As discussed with reference to the hexagonal filter above, weight transfer from 3×3 kernels, pre-trained on perspective data, is also possible with this implementation of the filter, and is performed in similar fashion.

North-alignment of the filter is also possible and its implementation does not differ from the implementation with the hexagonal filter. Similarly to the hexagonal filter, it can be assumed that the north pole axis passes between the first and the six vertex. The interpolation angle is again computed based on the angular distance between the vertices 1 and 6 and the north pole axis. As with the hexagonal filter, north-alignment is achieved through two convolutions which are weighted based on the interpolation angle.

The first interpolation is performed using the default vertices formation [1, 2, 3, 4, 5, 6, 7], and the second interpolation using a formation [6, 1, 2, 3, 4, 5, 7], as if the neighbourhood of vertices is shifter with 60 degrees in clock-wise direction.

Figure 8:
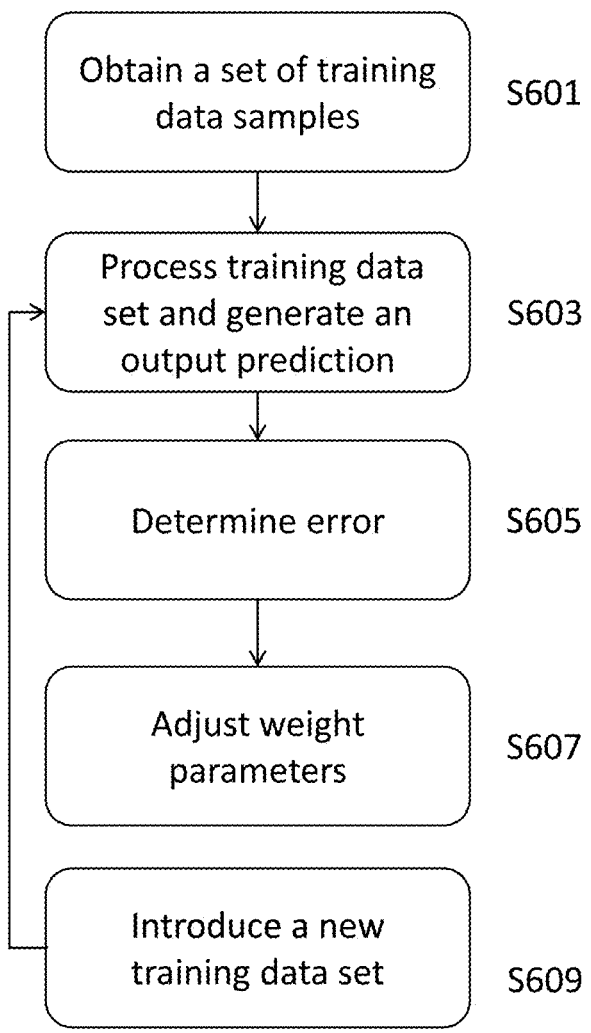
FIG. 8 is a flow diagram of an example process for training the neural network for object classification.

FIG. 8 illustrates a flowchart of an example process for training a neural network for orientation-aware semantic segmentation on icosahedron spheres, which can label objects shown in an input omnidirectional image. The neural network can be trained by processing many samples of training and, for every sample, adjusting the weight of each parameter in accordance with the error between the output generated by the neural network and a target output specified in the training sample. Once trained, the neural network can be deployed in a system, for example the neural network system of FIG. 1. The training procedure can be carried out by one or more computers.

In Step S601, the training system obtains a set of training data. Each data set comprises a training image and a target output. The input image is a representation of an image that shows one or more objects. For example, the image may include objects located in the vicinity of an autonomous or semi-autonomous vehicle. The training images represented by the training data set are different from one another and may or may not contain similar objects. The training target output of the training data sets represents the desired output of the object classification network which should be generated by the neural network. The target output is compared with the actual output of the neural network and the weighting parameters are adjusted so that the error between the target output and the generated output is reduced. In Step S603, the neural network processes a sample input image using the current values of the internal parameters and generates an output image.

In Step S605, the predicted output of the neural network is compared with the target output part of the training data set and the error in the prediction is estimated. Consecutively, in Step S607 the weight of each internal parameter is adjusted so that the error between the predicted output and the target output is reduced to minimum.

In Step S609, the neural network is provided with a different set of training data and the training returns to step S603 in order to repeat the training procedure and adjust the internal parameters of the neural network so that a smaller error in the predicted output and the target output is achieved.

For the purposes of evaluating the network for orientation-aware semantic segmentation on icosahedron spheres, a spherical MNIST dataset is prepared for non-rotated training and testing (N/N), non-rotated training with rotated testing (N/R), and rotated training and testing (R/R) tasks. The non-rotated and rotated versions of the MNIST dataset are generated using a UGSCNN source code. The training and testing dataset comprises 60,000 and 10,000 digits, respectively, and the input images are on a level-4 icosahedron mesh (r=4). The current network, called "HexRUNet-C", comprises 74,730 parameters and is trained with batch size of 15 and initial learning rate of 0.0001. Furthermore, an Adam optimizer and cross-entropy loss for the digits classification task are used.

TABLE 1

| Level | a | Block | b | c | s |
|---|---|---|---|---|---|
| 4 | 1 | HexConv | — | 16 | 1 |
| 4 | 16 | ResBlock | 64 | 64 | 2 |
| 3 | 64 | ResBlock | 256 | 256 | 2 |
| 2 | 256 | MaxPool | — | — | 1 |
| — | 256 | Dense | — | 10 | 1 |

TABLE 2

| Branch 1 | Branch 2 |
|---|---|
| — | Conv2D 1/1, (a, b), pool, BN, f |
| — | HexConv, (b, b), BN, f |
| Conv2D 1/1, (a, c), pool, BN | Conv2D 1/1, (b, c), BN |
| add, f | |

In the proposed network, a convolution layer with the above-described hexagonal filter is applied, followed by two convolutional residual blocks, and a max pooling layer is employed before the final dense layer. The architecture of the proposed network is presented in Table 1, and the architecture of the convolutional residual blocks used for this network and further evaluation methods described below is presented in Table 2. Table 3 presents results achieved by the HexRUNet-C network used with residual U-Net architecture, which has been specifically modified to adapt to the classification task. The network achieves 99.45% for non-rotated training and testing. The method is designed to be orientation-aware and consequently rotation-variant.

TABLE 3

| Method | N/N | N/R | R/R |
|---|---|---|---|
| HexRUNet-C | 99.45 | 29.84 | 97.05 |

The performance of the proposed network was further evaluated on task relating to climate pattern segmentation, where the extreme weather events such as tropical cyclones (TC) and atmospheric rives (AR) are predicted from simulated global climate data.

In this network, two variants of the residual U-Net architecture are employed. The two variants of the network called HexRUNet-8 and HexRUNet-32 comprise 16 input channels and 8 or 32 output channels for the first convolutional layer, respectively. The training set comprises 43,916 patterns and 6,274 validation samples, and the network is trained with a batch size 60, initial learning rate of 0.001 with Adam optimizer and weighted cross-entropy loss is used to compensate for the unbalanced classes distributions. The total number of parameters is 7,543,331 for HexRUNet-32 and 476,747 for HexRUNet-8 and the input signal is mapped on a level-5 mesh. The architecture of the network used in the task of climate pattern segmentation is presented in Table 4, which will be further explained below with reference to the 2D3DS omnidirectional semantic segmentation experiment. The architecture of the residual blocks is as shown in Table 2 above.

TABLE 4

| Level | a | Block | b | c | s |
|---|---|---|---|---|---|
| 5 | 4 | HexConv | — | 16 | 1 |
| 5 | 16 | ResBlock | 16 | 32 | 2 |
| 4 | 32 | ResBlock | 32 | 64 | 2 |
| 3 | 64 | ResBlock | 64 | 128 | 2 |
| 2 | 128 | ResBlock | 128 | 256 | 2 |
| 1 | 256 | ResBlock | 256 | 256 | 2 |
| 0 | 256 | HexConv$^T$ | — | 256 | 0.5 |
| 1 | 256 × 2 | ResBlock | 128 | 128 | 0.5 |
| 2 | 128 × 2 | ResBlock | 64 | 64 | 0.5 |
| 3 | 64 × 2 | ResBlock | 32 | 32 | 0.5 |
| 4 | 32 × 2 | ResBlock | 16 | 16 | 0.5 |
| 5 | 16 × 2 | ResBlock | 16 | 16 | 1 |
| 5 | 16 | HexConv | — | 13 | 1 |

Figure 9:
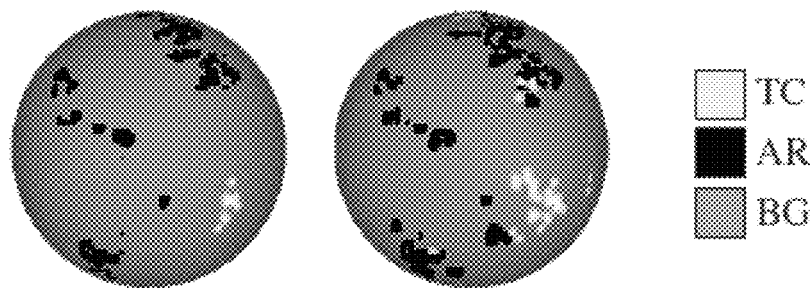
FIG. 9 is semantic segmentation results of HexRUNet-32 on climate pattern (Right) in comparison to ground-truth (left)

Table 5 below shows the performance of the variants of the proposed network for climate pattern segmentation tasks and FIG. 9 shows semantic segmentation results of HexRUNet-32 on climate pattern (Right) in comparison to ground-truth (left). The evaluation results are presented in terms of the accuracy of the network in predicting Tropical Cyclones, denoted by TC, Atmospheric Rivers, denoted by AT, mean class accuracy and mean average precision (mAP). The background class is denoted by BG.

TABLE 5

| Method | BG | TC | AR | Mean | mAP |
|---|---|---|---|---|---|
| HexRUNet-8 | 95.71 | 95.57 | 95.19 | 95.49 | 0.518 |
| HexRUNet-32 | 97.31 | 96.31 | 97.45 | 97.02 | 0.555 |

The performance of the proposed network is also evaluated in an omnidirectional semantic segmentation experiments with the 2D3DS dataset. The 2D3DS dataset is comprised of 1,413 equirectangular RGB-D images (RGB and Depth), and the ground-truth attributes each pixel to one of 13 classes. Prior to being input to the convolution network, the depth data of the omnidirectional RGB-D images is converted to meters and limited in the range between 0 and 4 meters, and the RGB data is converted to the range between 0 and 1 by division of 255. Consecutively, all data is mean subtracted and standard deviation normalised. Once pre-processed, the input signal for the experiment is sampled on a level-5 mesh (r=5).

In the icosahedron mesh, the number of vertices and faces is increased by a factor of 4 for each resolution level. During down-sampling from resolution r to resolution r−1, a neighbourhood of 4 triangles at resolution r is summarised with a single triangle at resolution r−1. Therefore, for vertices $v_i$, where vertices $v_i$ exist at resolution r and r−1, pooling is performed over the $\{v_i, v_{n_1}i, v_{n_2}i, v_{n_3}i\}$ neighbourhood. Thus, simple 2-strided pooling with 2×2 kernel is applied to each segment of the icosahedron.

Following the algorithm below, bi-linear up-sampling or transposed convolutions are applied by applying padding to the top and left of sides of the icosahedron segments, as shown in FIG. 4(b). Prior to up-sampling features in $\{F_i\}_{i=0}^4$, padding is added to the top and left side of each segment $\{C_i\}_{i=0}^4$ of the icosahedron, and proceeded by up-sampling by a factor of 2 in height and width—stride 0.5. As a result of up-sampling the padded segments, the resultant image comprises a 1-pixel border on each side. The border is consecutively removed before the image is provided to the next convolutional layer. This is performed using the following algorithm:

---

Result: Given components $\{C_i\}_{i=0}^4$ get bi-linear up-sampling $\{F_i\}_{i=0}^4$.
$\{C_i\}_{i=0}^4 \leftarrow \text{WestPadding}(\{C_i\}_{i=0}^4)$;   // Alg. 1
for i ← {0, . . . , 4} do
 | $F_i$ ← upsample($C_i$);   // 2× up-sampling
 | Cut 1 pixel width from all sides of $F_i$;
end

---

The network architecture used for the omnidirectional semantic segmentation experiment with the 2D2DS dataset, as shown in Table 4, comprises encoder layers followed by decoder layers. In the encoder part of the framework, down-sampling through pooling is employed, as described above, in order to summarise the neighbourhood of features to introduce robustness towards image translations and omissions. Bi-linear up-sampling or transposed convolutions is employed, as described above, in the decoder part of the framework to increase sub-sampled feature maps to larger resolutions.

Initially, the pre-processed equirectangular RGB-D image, sampled at resolution r=5, is input to a convolutional layer with a hexagonal filter and 16 output channels, denoted by HexConv. The use of 16 output channels of the first convolutional layer results in a 1,585,885 parameters for the network. The first HexConv is then followed by down-sampling through pooling employed using a series of 5 residual blocks with stride 2. The residual blocks consecutively reduce the resolution level to 1 and increase the number of the feature maps by a factor of 2 for each block to 256 feature maps at the output of the fifth residual block at level-0 resolution. At level-0, up-sampling is performed followed by a point-wise HexConv layer in order to increase the resolution to level-1, denoted by HexConv$^T$.

Subsequently, up-sampling is performed followed by a point-wise HexConv layer using four residual blocks with stride 0.5, and one additional residual block with stride 1. The input of each up-sampling block is concatenated with the output from the previous layers which is at a corresponding resolution level. For example, referring to Table 4, the input of the first ResBlock of the up-sampling part of the framework is comprised by the output of the HexConv$^T$ layer, comprising 256 feature maps at resolution level-1, concatenated with the output of the $4^{th}$ ResBlock of the down-sampling part of the framework. In Table 4, the ResBlock layers, where the input is concatenated with the output of the previous layers at the corresponding resolution are denoted with doubled input volume size. The output of the network comprised 13 channels, rather than 15, as the "unknown" and "invalid" classes of the 2D3DS dataset are not evaluated during validation.

Figure 10:
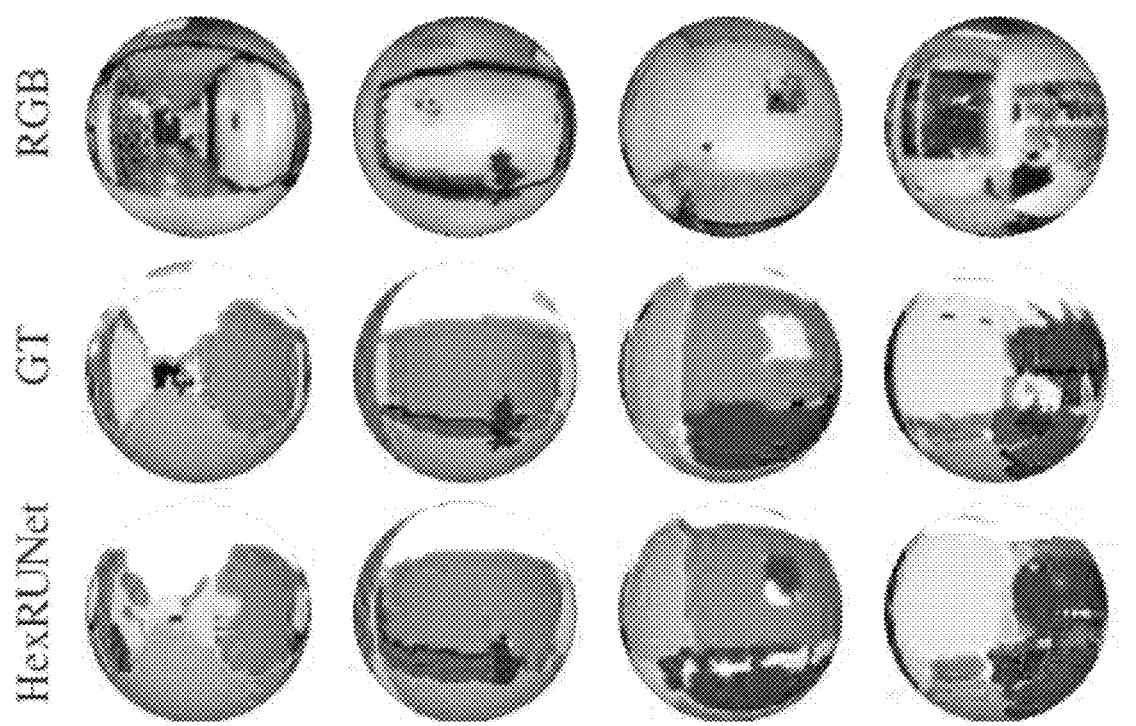
FIG. 10 is qualitative segmentation results on 2D3DS dataset.
Figure 11:
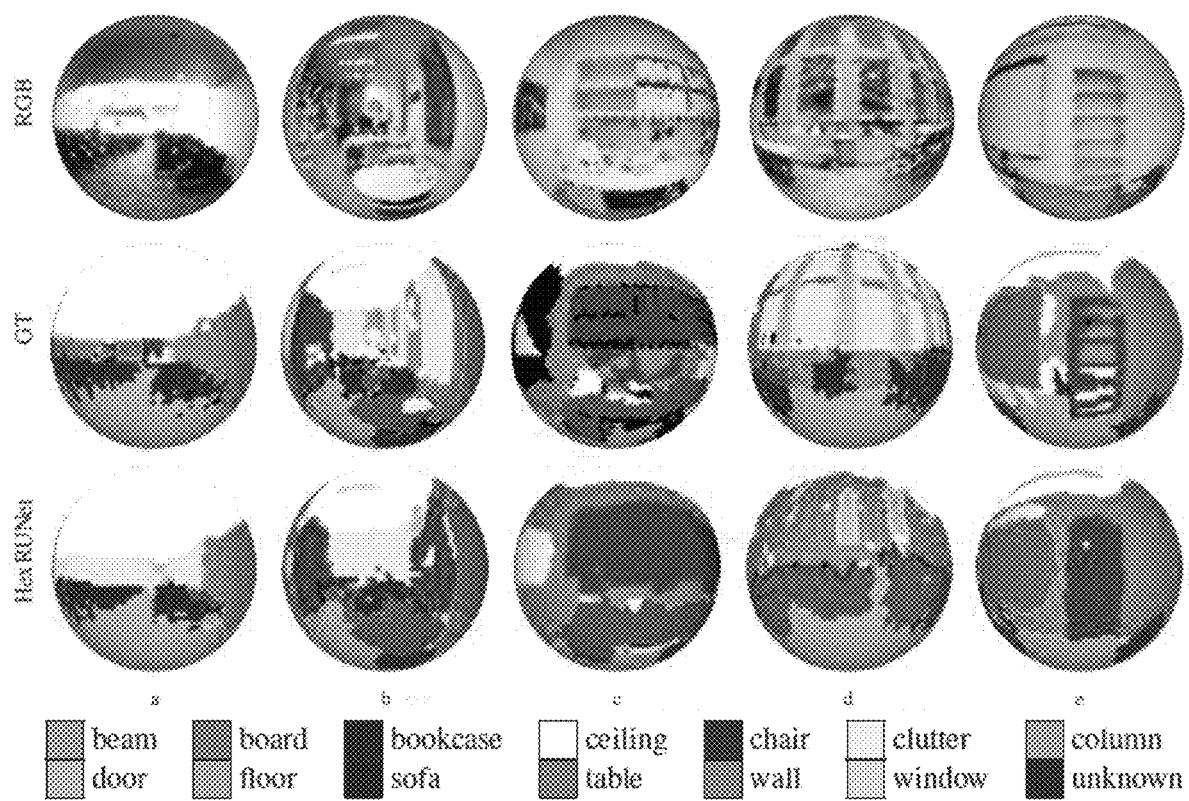
FIG. 11 is quantitative segmentation results and failed cases on 2D3DS dataset.

The proposed HexRUNet is trained with a batch size 32, initial learning rate of 0.001 with Adam optimizer, up to 500 epochs. Class-wise weighted cross-entropy loss is used to balance the class examples. The performance of the network is evaluated following 3-fold dataset splits including non-overlapping training data and validation data, and the results in terms of mean intersection over union (mIoU) and class accuracy (mAcc) are presented in Table 6 and 7, respectively, and FIGS. 10 and 11 shows qualitative segmentation results on 2D3DS dataset. The HexRUNet has achieved mIoU of 43.3% and mAcc of 58.6%.

Figure 12:
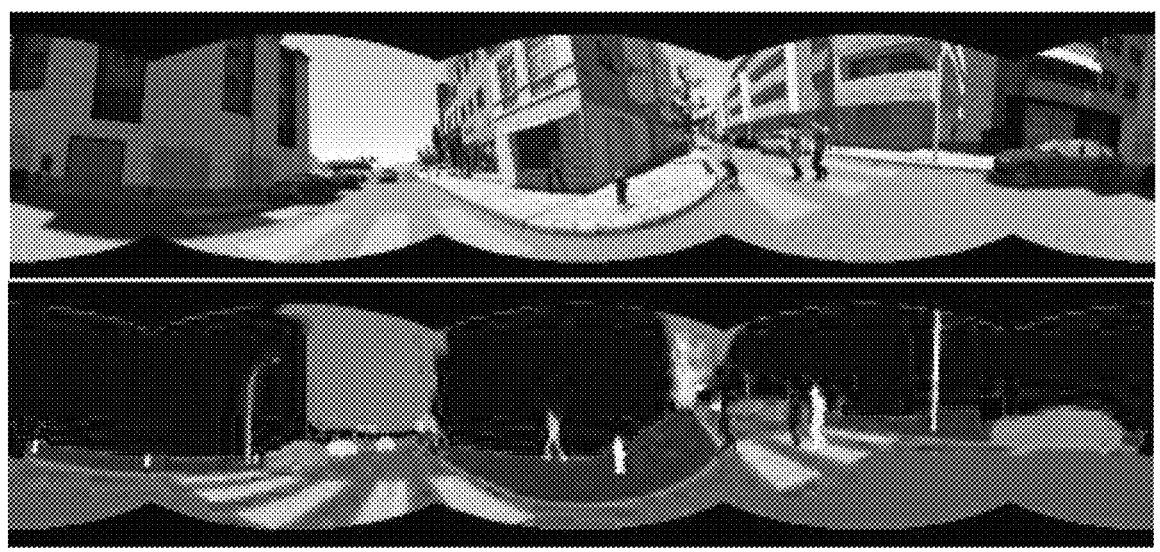
FIG. 12 is an example of the Omni-SYNTHIA dataset images (top) and labels (bottom). Top and bottom parts of the images are cropped only for visualisation.

FIG. 11 shows examples in which the proposed method failed to accurately predict the correct labels for some of the objects in the scene. In case (a), the RGB image shows bright illuminations at the centre of the scene, which the method wrongly classifies as windows. In case (b), the dark windows is classified as a bookcase, and in case (c) the network has failed to segment the boundary of the bookcase. In case (d), the network has failed to recognise and classify the windows and the chairs. In case (e), it can be seen that the bookcase is not accurately represented in the ground-truth, as parts of the bookshelf are classified as part of the wall. The proposed network, however, has adequately classified the bookshelf.

camera centre. The cameras capture views at 90 degree intervals with a field of view of 100 degrees each, and resolution of 760×1280. Visual overlap is then used to generate an omnidirectional image with resolution of 2096× 4192, which can be used for the purpose of the experiment. For the Omni-SYNTHIA experiment, omnidirectional images are acquired simulating 5 different places (2 New York-like, 2×Highway-like and 1 European-like) during the summer season. Sample representation of the created Omni-SYNTHIA data sub-set images is presented in FIG. 12.

The Omni-SYNTHIA data set is split into a training set comprising 1,818 images from the New York-like and Highway-like sequences and validation set comprising 451 images of the European-like sequence. The images comprises only RGB channels and the ground-truth includes pixel wise semantic labels of 14 classes including the "invalid" class. The icosahedron mesh is at r=6 and is populated with data from equirectangular images using interpolation for RGB data and nearest neighbour for labels.

For this experiment, an architecture based on the standard U-Net architecture is proposed. The U-Net architecture facilitates weight transfer from the perspective U-Net into one of the experiments discussed below. The architecture of the proposed network, called HexUNet, is presented in Table 8. The network comprises 4 encoder blocks, followed by 4 decoded blocks and 3 HexConv layers.

TABLE 8

| Level | a | Block | b | c | s |
|---|---|---|---|---|---|
| 6 | 3 | Encoder | — | 32 | 2 |
| 5 | 32 | Encoder | — | 64 | 2 |
| 4 | 64 | Encoder | — | 128 | 2 |
| 3 | 128 | Encoder | — | 256 | 2 |
| 2 | 256 | Decoder | 512 | 256 | 0.5 |
| 3 | 256 × 2 | Decoder | 256 | 128 | 0.5 |
| 4 | 128 × 2 | Decoder | 128 | 64 | 0.5 |
| 5 | 64 × 2 | Decoder | 64 | 32 | 0.5 |
| 6 | 32 × 2 | HexConv, BN, f | — | 32 | 1 |
| 6 | 32 | HexConv, BN, f | — | 32 | 1 |
| 6 | 32 | HexConv | — | 13 | 1 |

TABLE 6

| Method | mIoU | beam | board | bookcase | ceiling | chair | clutter | column | door | floor | sofa | table | wall | window |
|---|---|---|---|---|---|---|---|---|---|---|---|---|---|---|
| HexRUNet | 43.3 | 10.9 | 39.7 | 37.2 | 84.8 | 50.5 | 29.2 | 11.3 | 45.3 | 92.9 | 19.1 | 49.1 | 63.8 | 29.4 |

TABLE 7

| Method | mAcc | beam | board | bookcase | ceiling | chair | clutter | column | door | floor | sofa | table | wall | window |
|---|---|---|---|---|---|---|---|---|---|---|---|---|---|---|
| HexRUNet | 58.6 | 23.2 | 56.5 | 62.1 | 94.6 | 66.7 | 41.5 | 18.3 | 64.5 | 96.2 | 41.1 | 79.7 | 77.2 | 41.1 |

The proposed method for orientation-aware semantic segmentation is further validated on a specifically created omnidirectional version of a subset of the SYNTHIA dataset, called Omni-SYNTHIA. In the original SYNTHIA dataset, consists of multi-viewpoint photo-realistic frames rendered from a virtual city. The synthetic images are captured with a stereo set-up comprised of 2 clusters of 4 cameras. The SYNTHIA dataset comes with semantic annotation for 13 classes.

For Omni-SYNTHIA data sub-set, is only used the left-stereo cluster which captures 4 viewpoints with common For encoder blocks, where stride s=2, down-sampling through pooling is performed. As before, with each encoder block the resolution level of the icosahedron mesh is reduced by a resolution level, while the feature maps in the output volume are doubled by each block to the maximum of 256 at resolution 2. The architecture of the encoder blocks is shown in Table 9. The encoder blocks comprise two HexConv layers followed by a pooling convolutional layer (pool). Batch Normalisation (BN) and rectified linear unit activation function (ReLU), denoted as 'f' in Table 9, are used with every HexConv layer in the encoder block.

TABLE 9

| Input | Operator | Output |
|---|---|---|
| a | HexConv, BN, f | c |
| c | HexConv, BN, f | c |
| c | Pool | c |

The architecture of the decoder block is presented in Table 10. The decoder blocks have residual bottleneck architecture consisting of 2 convolutional layers with hexagonal filters, followed by a bi-linear up-sampling layer (UP) and a point-wise convolutional layer (Conv2D). Batch Normalisation (BN) and rectified linear unit activation function (ReLU), denoted as 'f' in Table 10, are used with every convolutional layer in the decoder block except for the bi-linear up-sampling layer. Similarly, to the HexUNet architecture, the layers for which the input size is doubled, the output of the previous block is concatenated with the output of the encoder blocks at a corresponding resolution levels.

The resolution level and the number of feature maps in the output volume are restored to their initial values of level-6 mesh resolution and 32 feature maps before the output is passed through a series of 3 HexConv layers.

TABLE 10

| Input | Operator | Output |
|---|---|---|
| a | HexConv, BN, f | b |
| b | HexConv, BN, f | b |
| b | Up | b |
| b | Conv2D 1/1, BN, f | c |

Figure 13:
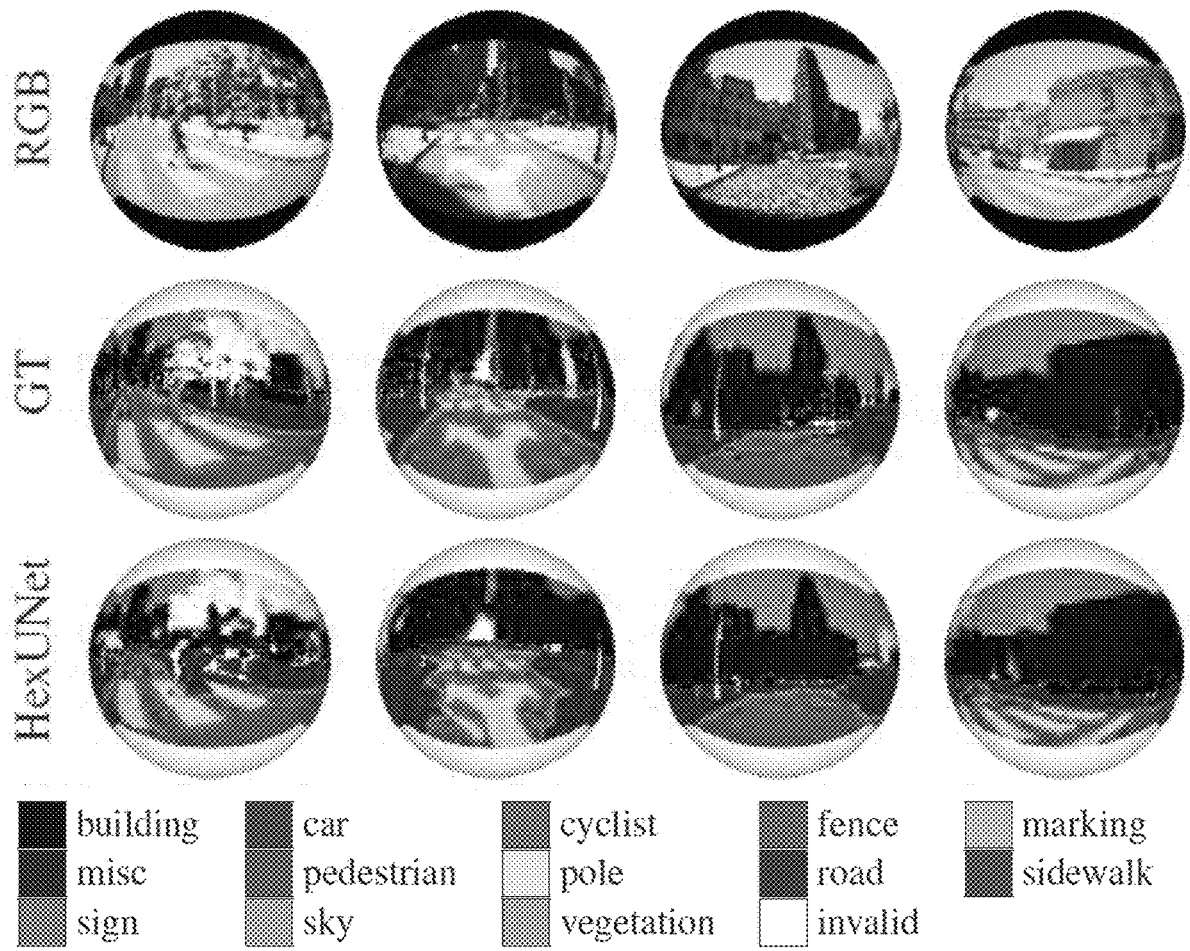
FIG. 13 is quantitative segmentation results on Omni-SYNTHIA dataset.

The performance of the proposed HexUNet network is again evaluated in terms of mIoU and mean accuracy, and the results are presented in Table 11 and Table 12, respectively. Quantitative results are presented in FIG. 13 and per class mIoU and mean accuracy are presented in Table 11 and 12.

HexUNet has achieved mIoU of 43.6% and mean accuracy of 52.2%. Performance on the proposed network is also evaluated without north-alignment, the network is denoted by HexUNet-nI, and with direct weight transfer, denoted by HexUNet-T. The evaluation of the networks was performed on a single Nvidia 1080Ti GPU with 11 Gb memory, and the networks were using data sampled at level-6, level-7, or level-8 mesh. For this reason images are sub-sampled to match the icosahedron mesh resolution level. The number of vertices falling into a region of the image are counted, and the image resolution is set to be approximately equivalent to the estimated number of vertices. The resultant resolution is 48×80 for level-6 meshes, 96×160 for level-7 meshes, and 192×320 for level-8 meshes. As presented in Tables 11 and 12, HexUNet achieves higher accuracy than HexUNet-nI, verifying the importance of orientation-aware filters in semantic segmentation tasks.

TABLE 11

| Method | mIoU | building | car | cyclist | fence | marking | misc | pedestrian | pole | sign | sidewalk | sign | sky | vegetation |
|---|---|---|---|---|---|---|---|---|---|---|---|---|---|---|
| HexUNet-T | 36.7 | 71.9 | 53.1 | 0.0 | 1.1 | 69.9 | 4.9 | 9.4 | 11.1 | 72.2 | 52.9 | 0.0 | 92.3 | 48.4 |
| HexUNet-nI | 42.4 | 77.1 | 64.8 | 0.0 | 2.4 | 74.3 | 10.4 | 2.6 | 23.6 | 84.7 | 68.8 | 1.0 | 93.1 | 48.7 |
| HexUNet | 43.6 | 81.0 | 66.0 | 0.0 | 2.9 | 71.6 | 13.7 | 5.6 | 38.4 | 83.1 | 67.0 | 1.5 | 93.3 | 50.2 |

TABLE 12

| Method | mAcc | building | car | cyclist | fence | marking | misc | pedestrian | pole | sign | sidewalk | sign | sky | vegetation |
|---|---|---|---|---|---|---|---|---|---|---|---|---|---|---|
| HexUNet-T | 44.8 | 80.0 | 60.9 | 0.0 | 1.6 | 74.7 | 26.9 | 0.4 | 13.0 | 80.0 | 75.2 | 0.0 | 96.2 | 73.4 |
| HexUNet-nI | 50.6 | 83.9 | 69.6 | 0.0 | 2.5 | 82.9 | 39.4 | 2.0 | 30.7 | 91.8 | 83.6 | 1.3 | 94.8 | 76.5 |
| HexUNet | 52.2 | 88.7 | 72.7 | 0.0 | 3.3 | 85.9 | 30.6 | 6.2 | 42.8 | 89.6 | 83.7 | 1.6 | 95.6 | 71.6 |

Many state of the art methods limit their mesh resolution to a level-5 resolution. However, high-resolution input and output results are beneficial for semantic segmentation tasks as finer segmentation is achieved at higher resolutions, the performance of the proposed methods is evaluated at different mesh resolution levels (r={6, 7, 8}). Evaluation is performed on a single Nvidia 1080Ti GPU with 11 Gb memory. The methods are implemented and benchmarked in Tensorflow, while PyTorch implementation is used for the comparison. The average training time per epoch, obtained by averaging the first 10 epochs, is 238 seconds for r=6, 406 seconds for r=7, and 978 seconds for r=8.

Figure 14:
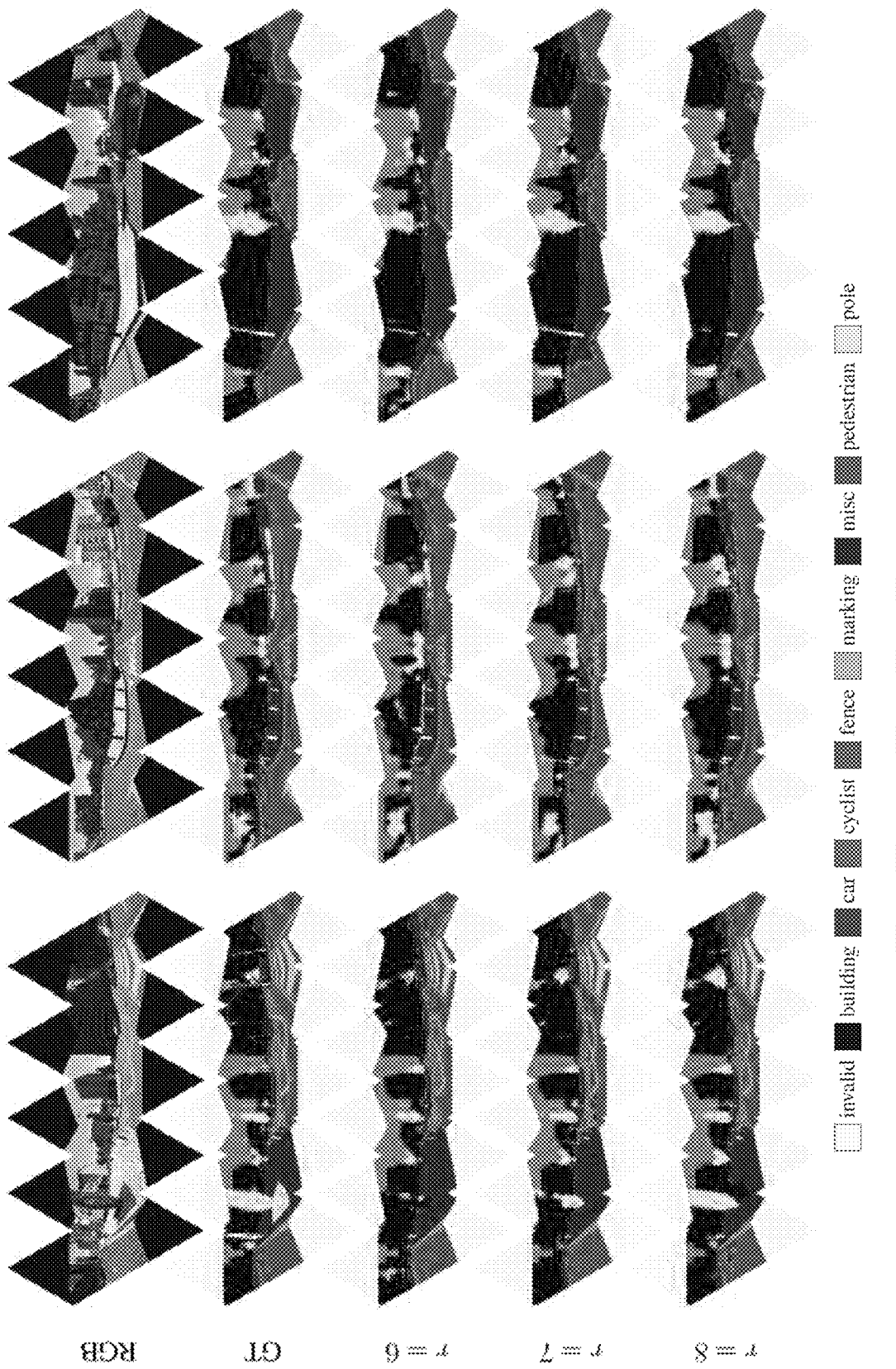
FIG. 14 is an unfolded visualisation of semantic segmentation results at different resolutions on Omni-SYNTHIA dataset.
Figure 15:
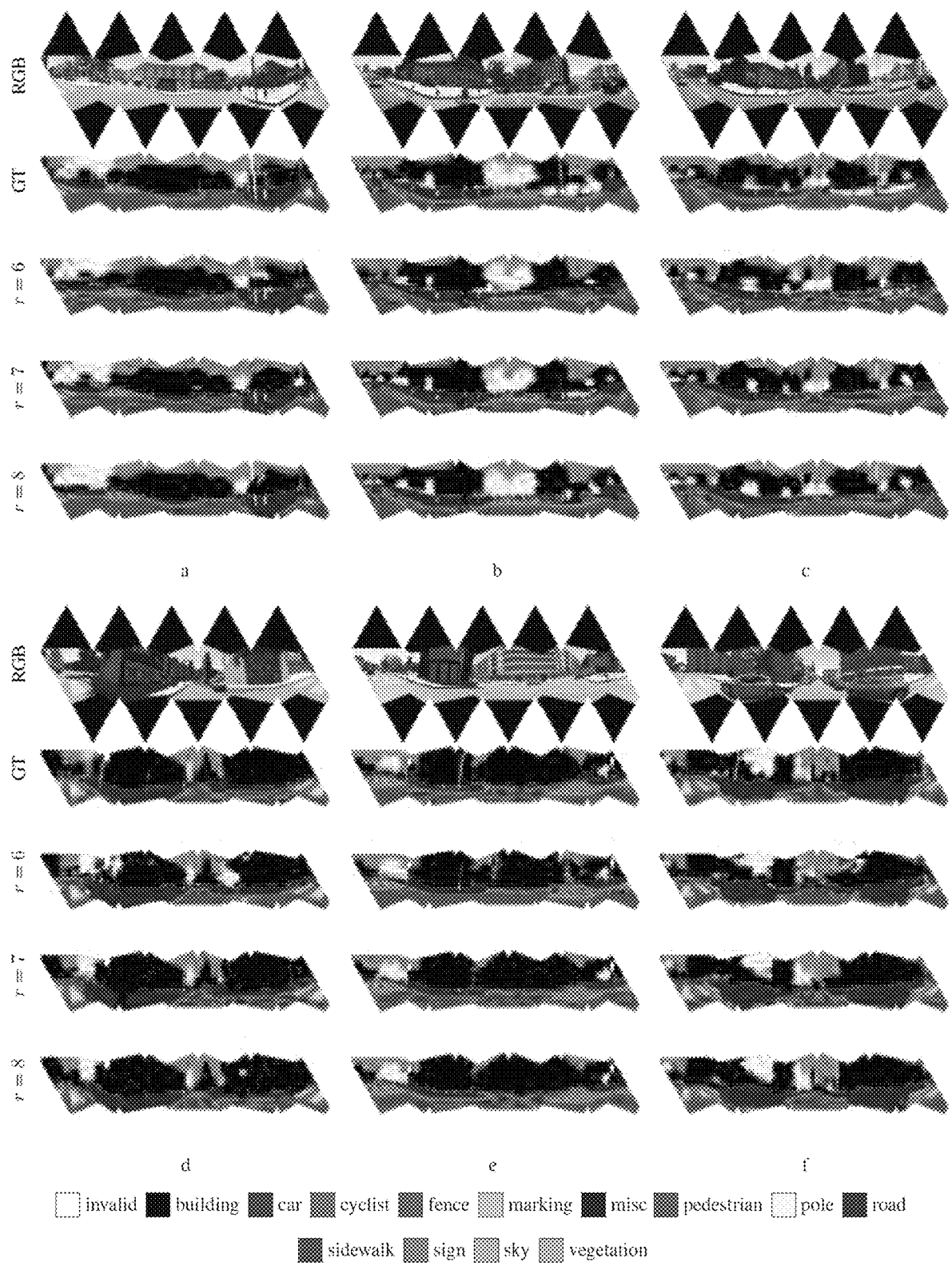
FIG. 15 is an unfolded visualisation of semantic segmentation results on Omni-SYNTHIA dataset at different resolutions.

Results for the proposed HexUNet-T, HexUNet-nI and HexUNet on the Omni-SYNTHIA dataset presented in terms of mIoU and mAcc are shown in Table 13. Since the proposed HexUNet architecture is based on the U-Net structure comprising only 4 encoder and decoder pairs, perception of context is reduced at resolution level r=8. This is further illustrated by the bottom-rightmost result in FIG. 14, where the front wheel of the car is misclassified as a road markings. In comparison, at level-6 and level-7, the network adequately labels the wheel. Furthermore, referring to FIGS. 15 (a), (c) and (f), at a higher resolution the segmentation of smaller objects and boundaries is improved.

TABLE 13

| | r = 6 | | r = 7 | | r = 8 | |
|---|---|---|---|---|---|---|
| Method | mIoU | mAcc | mIoU | mAcc | mIoU | mAcc |
| HexUNet-T | 36.7 | 44.8 | 38.0 | 47.2 | 45.3 | 52.8 |
| HexUNet-nI | 42.4 | 50.6 | 45.1 | 53.4 | 45.4 | 53.2 |
| HexUNet | 43.6 | 52.2 | 48.3 | 57.1 | 47.1 | 55.1 |

The use of an orientation-aware hexagonal convolution filter in the proposed method allows the direct transfer of weights from perspective networks, as descripted above. Initialised with the learned 3×3 filters from perspective U-net, weight refinement is limited to only 10 epochs, and the effectiveness of the direct weight transfer from a perspective network is demonstrated in Table 14. The weight transfer variant of the network achieves competitive results at resolution r=8, in comparison to the source network U-Net and the spherical variant of HexUNet trained on up to 500 epochs.

TABLE 14

| Method | r = 6 | r = 7 | r = 8 |
|---|---|---|---|
| UNet (Perspective) | 38.8 | 44.6 | 43.8 |
| HexUNet-T (1 epoch) | 29.4 | 30.3 | 35.9 |
| HexUNet-T (10 epochs) | 36.7 | 38.0 | 45.3 |
| HexUNet (500 epochs) | 43.6 | 48.3 | 47.1 |

Table 15 below shows the average evaluation time per validation (451 images) on Nvidia 1080Ti GPU with 11 Gb memory. Planar U-Net at equivalent resolution for front, back and side images (i.e. 1804 images) is also shown. HexUNet and U-Net are implemented in Tensorflow.

TABLE 15

| | r = 6 | r = 7 | r = 8 |
|---|---|---|---|
| HexUNet | 63 s | 65 s | 79 s |
| U-Net | 34 s | 36 s | 40 s |

Figure 16:
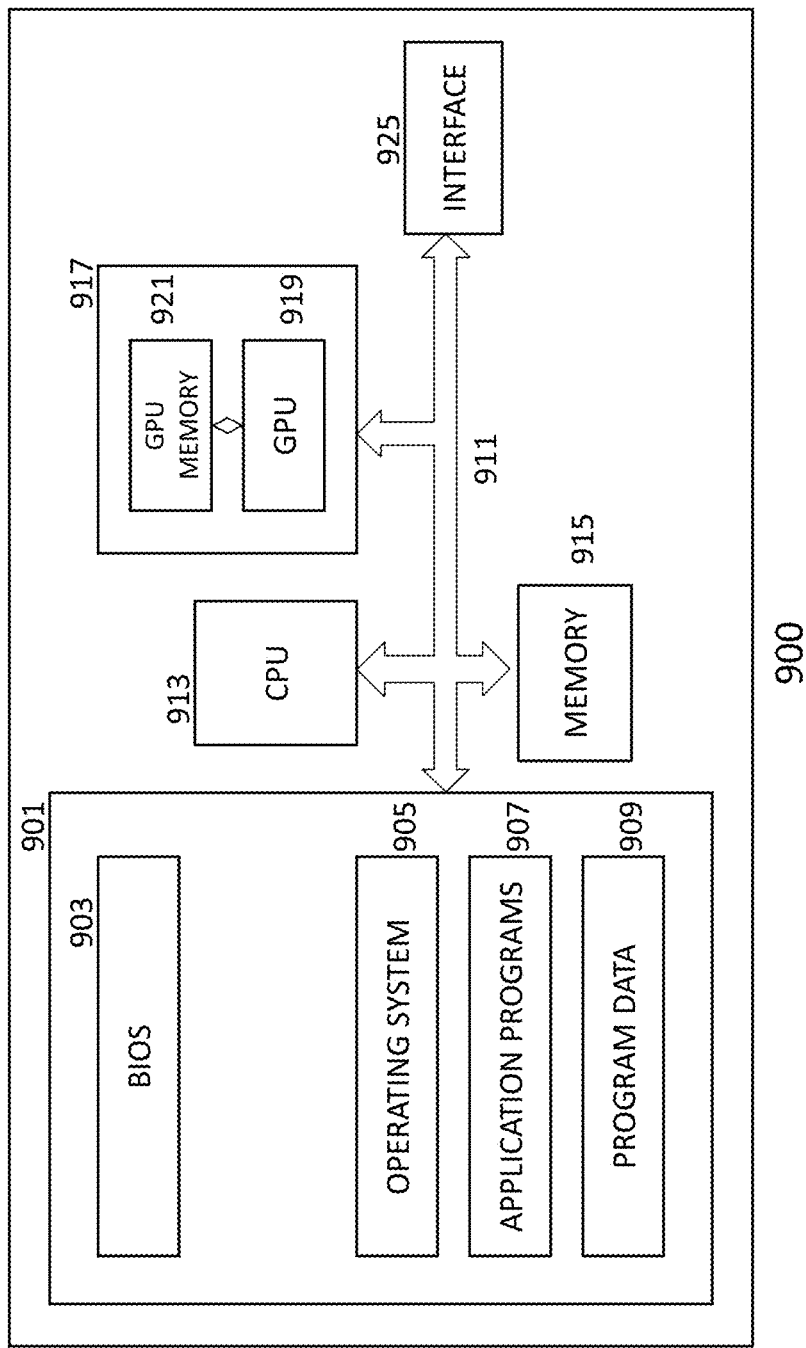
FIG. 16 is a schematic of a device that can be used in accordance with an embodiment.

FIG. 16 is a schematic of the hardware that can be used to implement methods in accordance with embodiments. It should be noted that this is just one example and other arrangements can be used.

The hardware comprises a computing section 900. In this particular example, the components of this section will be described together. However, it will be appreciated they are not necessarily co-located.

Components of the computing system 900 may include, but not limited to, a processing unit 913 (such as central processing unit, CPU), a system memory 901, a system bus 911 that couples various system components including the system memory 901 to the processing unit 913. The system bus 911 may be any of several types of bus structure including a memory bus or memory controller, a peripheral bus and a local bus using any of a variety of bus architecture etc. The computing section 900 also includes external memory 915 connected to the bus 911.

The system memory 901 includes computer storage media in the form of volatile/or non-volatile memory such as read-only memory. A basic input output system (BIOS) 903 containing the routines that help transfer information between the elements within the computer, such as during start-up is typically stored in system memory 901. In addition, the system memory contains the operating system 905, application programs 907 and program data 909 that are in use by the CPU 913.

Also, interface 925 is connected to the bus 911. The interface may be a network interface for the computer system to receive information from further devices. The interface may also be a user interface that allows a user to respond to certain commands et cetera.

In this example, a video interface 917 is provided. The video interface 917 comprises a graphics processing unit 919 which is connected to a graphics processing memory 921.

Graphics processing unit (GPU) 919 is particularly well suited to the above described method due to the operation of this multiple parallel calls. Therefore, in an embodiment, the processing may be divided between CPU 913 and GPU 919.

In one embodiment, the GPU is a NVIDIA 1080Ti with 11 Gb memory.

The above described architecture also lends itself to mobile telephones using GPUs.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A computer vision method for processing an omnidirectional image to extract understanding of a scene, the method comprising:
   receiving an omnidirectional image of the scene;
   mapping the omnidirectional image to a mesh on a three-dimensional polyhedron;
   converting the three-dimensional polyhedron into a representation of a neighborhood structure, wherein the representation of the neighborhood structure is a plurality of vectors representing vertices of the mesh and their neighboring vertices; and
   processing the representation of the neighborhood structure with a neural network processing stage to produce an output providing understanding of the scene,
   wherein the neural network processing stage comprises at least one module configured to perform convolution with a filter, the filter being aligned with a reference axis of the three-dimensional polyhedron; and
   wherein the reference axis is the north-south pole axis, the north-south pole axis being defined by a pair of vertices, of the vertices of the mesh, having a maximum z-axis distance on the polyhedron.

2. The method according to claim 1, wherein providing understanding of the scene comprises at least one of semantic segmentation, localization, detection of objects in the scene, registration of objects in the scene, camera pose estimation, depth sensing, and image enhancement.

3. The method according to claim 1, further comprising aligning the filter with the reference axis using a first convolution and a second convolution, and interpolating the first and second convolutions dependent on a location of the vertices on the three-dimensional polyhedron that are being filtered, wherein the first and second convolutions have identical convolution weights, and weights of the first convolution are rotated with respect to weights of the second convolution.

4. The method according to claim 3, wherein the interpolating step comprises using an arc-interpolation parameter.

5. The method according to claim 4, where the arc-interpolation parameter is based on an angular distance between the reference axis and a vector between a central vertex and a neighbouring vertex.

6. The method according to claim 1, wherein converting the three-dimensional polyhedron into the representation of the neighborhood structure comprises:
   unfolding the three-dimensional polyhedron to produce a two-dimensional unfolded polyhedron; and
   aligning the two-dimensional unfolded polyhedron with a rectangular grid to produce an aligned-to-a-rectangular-grid omnidirectional image, and the filter comprises weights, wherein the weights of the filter are arranged in a hexagonal formation.

7. The method according to claim 6, wherein the method further comprises dividing the two-dimensional unfolded polyhedron into a plurality of equivalent components, and aligning vertices of the unfolded polyhedron of each equivalent component with a rectangular grid to produce a plurality of aligned-to-a-rectangular-grid omnidirectional image components.

8. The method according to claim 7, wherein a layer of at least one pixel is added to at least one side of each of the plurality of aligned-to-a-rectangular-grid omnidirectional image components.

9. The method of according to claim 8, wherein the added layer of at least one pixel is provided from neighboring components.

10. The method according to claim 6, wherein the three-dimensional polyhedron is unfolded along a line, the line being equidistant from each of the pair of vertices with the maximum z-axis distance on the polyhedron.

11. The method according to claim 6, wherein vertices of the unfolded polyhedron are aligned with the rectangular grid through all affine transformation.

12. The method according to claim 1, wherein the polyhedron is an icosahedron.

13. The method according to claim 1, wherein converting the three-dimensional polyhedron into representation of the neighborhood structure comprises:
   forming the plurality of vectors, wherein each vector comprises a vertex of the mesh and its neighboring vertices.

14. The method according to claim 1, wherein the neighboring vertices of a vertex form a hexagon around the vertex.

15. The method of according to claim 1, wherein the filter is applied to a plane tangential to the omnidirectional image at a point of each vertex of the mesh.

16. A non-transitory computer-readable storage medium storing instructions configured to cause a computer to perform the method of claim 1.

17. A computer-implemented training method of training a model for processing an omnidirectional image to extract understanding of a scene, the model including
   a first mapping stage to map an omnidirectional image to a mesh on a three-dimensional polyhedron;
   a second mapping stage to convert the three-dimensional polyhedron into a representation of a neighborhood structure, wherein the representation of the neighborhood structure is a plurality of vectors representing vertices of the mesh and their neighbouring vertices, and
   a processing stage to process the representation of the neighborhood structure with a neural network processing stage to produce an output providing understanding of the scene,
   wherein the processing stage comprises at least one module configured to perform convolution with a filter, the filter aligned with a reference axis of the three-dimensional polyhedron, and wherein the reference axis is the north-south pole axis, the north-south pole axis being defined by a pair of vertices, of the vertices of the mesh, having a maximum z-axis distance on the polyhedron,
   the training method comprising:
      providing training data, the training data comprising image and semantic segmented information about an image; and
      training the model using the image as input and the semantic segmented information as output.

18. A system for processing an omnidirectional image to extract understanding of a scene, the system comprising:
   an interface; and
   processing circuitry,
   the interface having an image input and being configured to receive an omnidirectional image of a scene,
   the processing circuitry being configured to:
      map the omnidirectional image to a mesh on a three-dimensional polyhedron;
      convert the three dimensional polyhedron into a representation of a neighborhood structure, wherein the representation of the neighborhood structure is a plurality of vectors representing vertices of the mesh and their neighborhood vertices; and
      process the representation of the the neighborhood structure with a neural network processing stage to produce an output providing understanding of the scene,
   wherein the neural network processing stage comprising at least one module configured to perform convolution with a filter, the filter being aligned with a reference axis of the three-dimensional polyhedron, and
   wherein the reference axis is the north-south pole axis, the north-south pole axis being defined by a pair of vertices, of the vertices of the mesh, having a maximum z-axis distance on the polyhedron.

19. A detection system for a vehicle, the detection system comprising the system of claim 18, being configured to receive the omnidirectional image of the scene and extract understanding of the scene to determine a presence of objects in the scene.

* * * * *